(12) United States Patent
Bodo et al.

(10) Patent No.: US 11,095,424 B2
(45) Date of Patent: *Aug. 17, 2021

(54) METHOD AND APPARATUS FOR REFORMATTING AND RETIMING DIGITAL TELECOMMUNICATIONS DATA FOR RELIABLE RETRANSMISSION VIA USB

(71) Applicant: Computer Performance, Inc., Santa Clara, CA (US)

(72) Inventors: Martin J. Bodo, Los Altos Hills, CA (US); Robert A. Rosenbloom, Santa Cruz, CA (US); Sergey Bromirsky, Moscow (RU)

(73) Assignee: Computer Performance, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/501,247

(22) Filed: Mar. 11, 2019

(65) Prior Publication Data

US 2019/0215144 A1  Jul. 11, 2019

Related U.S. Application Data

(63) Continuation of application No. 15/330,502, filed on Sep. 28, 2016, now abandoned, which is a continuation of application No. 12/592,656, filed on Nov. 30, 2009, now Pat. No. 9,461,763.

(51) Int. Cl.
*H04L 12/64* (2006.01)
*H04L 7/00* (2006.01)
(Continued)

(52) U.S. Cl.
CPC .......... *H04L 7/0016* (2013.01); *H04J 3/0658* (2013.01); *H04J 3/1623* (2013.01); *H04L 12/6418* (2013.01); *H04M 3/304* (2013.01)

(58) Field of Classification Search
CPC ......... H04L 12/6418; H04L 2012/6459; H04L 2012/6475; H04L 29/06027;
(Continued)

(56) References Cited

U.S. PATENT DOCUMENTS 6,021,129 A   1/2000 Martin et al.
6,608,894 B1  8/2003 Armenta
(Continued)

*Primary Examiner* — Yemane Mesfin
*Assistant Examiner* — Mon Cheri S Davenport
(74) *Attorney, Agent, or Firm* — Donald E. Schreiber

(57) ABSTRACT

A method for retiming digital telecommunications data received by a digital logger from a plurality of T-carrier type telephone lines respectively having differing clock sources ensures efficient transmission of received digital audio data to a host computer via a Universal Serial Bus ("USB") interface. Also the digital logger includes volatile memory for temporarily storing digital audio data received from the plurality of T-carrier type telephone lines for:
1. ensuring that the host computer receives digital audio data correctly via the USB interface;
2. buffering the digital audio data within the digital logger during interruptions in transmission of digital audio data from the digital logger via the USB interface; and
3. reducing audible latency of speech communications.

8 Claims, 2 Drawing Sheets

(51) Int. Cl.
*H04J 3/16* (2006.01)
*H04J 3/06* (2006.01)
*H04M 3/30* (2006.01)

(58) Field of Classification Search
CPC ..... H04L 2012/6489; H04L 2012/6481; H04L 47/2416; H04J 3/16; H04J 3/06
USPC ............... 370/241, 250, 251, 252, 253, 271, 370/351–359, 466, 503–510
See application file for complete search history.

(56) References Cited

U.S. PATENT DOCUMENTS

| | | | |
|---|---|---|---|
| 6,658,499 B1 | 12/2003 | Day et al. | |
| 6,675,250 B1 | 1/2004 | Ditner et al. | |
| 6,751,315 B1 | 6/2004 | Liu et al. | |
| 6,781,957 B2 | 8/2004 | Haislett | |
| 6,865,687 B1 | 3/2005 | Ichimi | |
| 6,978,412 B1 | 12/2005 | Reents et al. | |
| 6,985,492 B1 * | 1/2006 | Thi | H04B 3/23 370/252 |
| 7,073,010 B2 | 7/2006 | Chen et al. | |
| 7,154,865 B1 | 12/2006 | Fulcomer et al. | |
| 7,215,670 B1 | 5/2007 | Karlsson et al. | |
| 7,218,631 B1 | 5/2007 | Bebko | |
| 7,577,756 B2 * | 8/2009 | Teowee | F42D 1/05 709/208 |
| 2003/0039263 A1 | 2/2003 | Haislett | |
| 2006/0034230 A1 | 2/2006 | Welhausen et al. | |
| 2006/0224936 A1 | 10/2006 | Takamatsuya | |
| 2007/0233430 A1 | 10/2007 | Singh | |
| 2008/0003983 A1 | 1/2008 | Bodo | |
| 2008/0049792 A1 * | 2/2008 | Ludwig | H04L 12/2859 370/493 |

* cited by examiner

METHOD AND APPARATUS FOR REFORMATTING AND RETIMING DIGITAL TELECOMMUNICATIONS DATA FOR RELIABLE RETRANSMISSION VIA USB

CLAIM OF PROVISIONAL APPLICATION RIGHTS

This patent application claims the benefit of U.S. Provisional Patent Application No. 61/200,448 filed on Nov. 28, 2008. U.S. Provisional Patent Application No. 61/200,448 is hereby incorporated by reference as though fully set forth here.

COPYRIGHT NOTICE

A portion of the disclosure of this patent document contains material that is protected by copyright. The copyright owner hereby grants others a right to reproduce copies of the patent document or the patent disclosure exactly as it appears in the files of the United States Patent and Trademark Office, but otherwise reserves all rights whatsoever under copyright specifically including the right to produce derivative works.

COMPACT DISK APPENDIX

Appendix I hereto, comprising a pair of identical compact disks ("CD-Rs"), is hereby incorporated by reference. The accompanying pair of identical compact disks have the following characteristics.

Machine Format: IBM-PC
Operating System Compatibility: Microsoft Windows XP
List of files for directory
\Loggerapp_service_and_8T1_code\COM_Utils

| Creation | Date | Size | File Name |
|---|---|---|---|
| Jul. 21, 2005 | 03:28 PM | 752 | AbstractInterfaceDefinition.h |
| Feb. 16, 2005 | 04:43 AM | 749 | InClassInterfaceDefinition.h |
| Jul. 21, 2005 | 03:27 PM | 488 | InterfaceUndefinition.h |
| Apr. 4, 2006 | 10:51 AM | 920 | InterfaceUtils.h |
| Feb. 16, 2005 | 04:43 AM | 743 | OutClassInterfaceDefinition.h |

List of files for directory
\Loggerapp_service_and_8T1_code\Common

| Creation | Date | Size | File Name |
|---|---|---|---|
| Jun. 24, 2006 | 03:55 PM | 793 | CallAnalysisCommonConfig.h |
| Jun. 15, 2007 | 09:23 PM | 18,661 | CallAnalysis_Params.h |
| Jun. 15, 2007 | 09:23PM | 18,661 | CallAnalysis_Params.old |
| Nov. 11, 2006 | 11:05 PM | 1,016 | ChannelInfo.h |
| Feb. 22, 2008 | 02:47 PM | 2,121 | CommonParamsConfig.h |
| Feb. 21, 2008 | 07:41 PM | 1,055 | Common_Params.h |
| Nov. 21, 2008 | 03:02 PM | 1,017 | DatabaseParametersRedefinition.h |
| Nov. 21, 2008 | 12:42 PM | 264 | DatabaseParametersUndefinition.h |
| Apr. 1, 2008 | 11:49 PM | 2,329 | DependencyEnumeration.h |
| Oct. 18, 2006 | 03:51 PM | 98 | DependencyUnDefinition.h |
| Feb. 22, 2008 | 01:03 PM | 719 | DeviceConfig_.h |
| Feb. 23, 2008 | 04:03 PM | 1,453 | Device_Params.h |
| Oct. 16, 2006 | 12:44 PM | 27,707 | DirStat.cpp |
| Oct. 16, 2006 | 12:57 PM | 5,119 | DirStat.h |
| Oct. 29, 2008 | 08:13 PM | 10,026 | FileManager_Params.h |
| Feb. 21, 2008 | 09:54 PM | 6,252 | NonVirtualFunctionsDefinition.h |
| Mar. 29, 2008 | 08:12 PM | 1,579 | ParamDesc.h |
| Jun. 10, 2008 | 11:31 AM | 8,444 | ParametersAssignDefinition.h |
| Nov. 7, 2008 | 10:28 PM | 15,007 | ParametersCompareToINI.h |
| Apr. 10, 2008 | 12:23 PM | 6,474 | ParametersDefineChangeFlags.h |
| Jun. 10, 2008 | 11:31 AM | 16,724 | ParametersDefinition.h |
| Jun. 12, 2008 | 01:18 PM | 45,477 | ParametersEnumeration.h |
| Jun. 10, 2008 | 11:30 AM | 5,979 | ParametersInitializationDefinition.h |
| Apr. 10, 2008 | 12:32 PM | 6,194 | ParametersInitializeChangeFlags.h |
| Dec. 7, 2007 | 07:12 PM | 7,893 | ParametersLog.h |
| Apr. 10, 2008 | 12:34 PM | 10,569 | ParametersLog1.h |
| Apr. 10, 2008 | 12:36 PM | 11,423 | ParametersLog1IfChanged.h |
| Apr. 1, 2008 | 10:46 PM | 15,541 | ParametersProperties.h |
| Dec. 7, 2007 | 06:02 PM | 10,934 | ParametersProperties_NET8CPP.h |
| Dec. 11, 2007 | 09:43 AM | 10,957 | ParametersProperties_NETCPP.h |
| Jun. 18, 2008 | 09:38 PM | 12,736 | ParametersReadFromINI.h |
| Jun. 10, 2008 | 11:31 AM | 2,781 | ParametersUnDefinition.h |
| Jan. 30, 2008 | 11:32 PM | 1,333 | Purging_Params.h |
| Nov. 15, 2008 | 11:22 PM | 3,131 | System_Params.h |
| Dec. 7, 2007 | 07:17 PM | 6,126 | VirtualFunctionsDefinition.h |
| Jun. 12, 2008 | 06:29 PM | 298 | delays_inclass_definition.h |
| Jun. 12, 2008 | 06:18 PM | 199 | delays_inclass_initialization.h |
| Jun. 20, 2008 | 03:06 AM | 481 | delays_report_definition.h |
| Jun. 12, 2008 | 05:22 PM | 67 | delays_undefinition.h |

-continued

| | | | |
|---|---|---|---|
| Feb. 28, 2006 | 10:05 AM | 4,053 | ulawlib1.cpp |
| Feb. 13, 2006 | 03:14 PM | 798 | ulawlib1.h |

List of files for directory
\Loggerapp_service_and_8T1_code\Common\DLI_HEADERS

| Creation | Date | Size | File Name |
|---|---|---|---|
| Feb. 16, 2005 | 04:43 AM | 4,007 | DLI10_Header.h |
| Apr. 10, 2006 | 12:30 AM | 5,217 | DLI20_Header.h |
| Apr. 21, 2006 | 11:26 PM | 444 | DLIEXT2_CID_NAME_auheader.h |
| Apr. 21, 2006 | 11:27 PM | 471 | DLIEXT2_INCOMING_CID_auheader.h |
| Apr. 21, 2006 | 11:26 PM | 478 | DLIEXT2_UTGOING_DTMP_auheader.h |
| Apr. 10, 2006 | 12:31 AM | 360 | DLIEXT_CID_NAME_auheader.h |
| Apr. 21, 2006 | 08:38 PM | 217 | DLI_EXT_HeaderList.h |
| Apr. 6, 2005 | 07:26 PM | 492 | DLI_ExtendedHeader.h |
| Apr. 11, 2006 | 10:36 AM | 538 | DLI_FileIntegrityDiscriminatorHeader.h |

List of files for directory
\Loggerapp_service_and_8T1_code\Common\MD5

| Creation | Date | Size | File Name |
|---|---|---|---|
| Apr. 9, 2006 | 10:17 PM | 1,350 | md5.h |
| Apr. 9, 2006 | 10:26 PM | 10,294 | md5c.cpp |

List of files for directory
\Loggerapp_service_and_8T1_code\Common\VUMeter

| Creation | Date | Size | File Name |
|---|---|---|---|
| Sep. 8, 2008 | 08:46 AM | 19,421 | VUMeter.cpp |
| May 15, 2006 | 02:34 PM | 24,006 | VUMeter.cpp.old |
| Sep. 5, 2008 | 12:26 PM | 5,810 | VUMeter.h |
| May 15, 2006 | 05:01 PM | 5,816 | VUMeter.h.old |
| Mar. 15, 2006 | 09:38 PM | 5,868 | VUMeter.~h |
| Jun. 24, 2006 | 05:47 PM | 6,185 | VUMeterConfig.h |
| Mar. 5, 2006 | 12:30 AM | 7,598 | VUMeterConfig.~h |
| Aug. 25, 2006 | 01:25 PM | 1,680 | VUMeter_Params.h |

List of files for directory
\Loggerapp_service_and_8T1_code\Configurator\CommonTypes

| Creation | Date | Size | File Name |
|---|---|---|---|
| Jun. 30, 2004 | 12:00 AM | 2,426 | AssemblyInfo.cs |
| Jun. 3, 2006 | 10:23 PM | 1,106 | CommonTypes.sln |
| May 20, 2008 | 03:25 PM | 1,116 | IPlugin.cs |

List of files for directory
\Loggerapp_service_and_8T1_code\Configurator\ConfAppPlugins\
LoggerPluginConnection

| Creation | Date | Size | File Name |
|---|---|---|---|
| Apr. 20, 2005 | 05:16 AM | 2,426 | AssemblyInfo.cs |
| Oct. 1, 2008 | 12:29 PM | 36,101 | LoggerPluginConnection.cs |
| May 23, 2006 | 01:31 AM | 929 | LoggerPluginConnection.sln |

List of files for directory
\Loggerapp_service_and_8T1_code\Configurator\ConfAppPlugins\LoggerPluginTypes

| Creation | Date | Size | File Name |
|---|---|---|---|
| Sep. 21, 2006 | 10:47 AM | 2,426 | AssemblyInfo.cs |
| Jan. 14, 2008 | 12:46 PM | 8,415 | LoggerPluginTypes.cs |

List of files for directory
\Loggerapp_service_and_8T1_code\Configurator\Servers\DliService

| Creation | Date | Size | File Name |
|---|---|---|---|
| Jul. 2, 2004 | 12:00 AM | 2,426 | AssemblyInfo.cs |
| Nov. 26, 2008 | 02:45 AM | 12,564 | DliService.sln |
| Apr. 20, 2007 | 12:13 AM | 3,909 | ProjectInstaller.cs |
| Apr. 19, 2007 | 09:10 PM | 6,411 | ProjectInstaller.resx |
| Feb. 18, 2008 | 08:36 PM | 4,486 | Service.cs |
| Nov. 2, 2006 | 08:33 PM | 25,425 | Service.resx |

-continued

| Jun. 15, 2005 | 05:39 PM | 20 | start_service.bat |
| Jun. 15, 2005 | 05:39 PM | 19 | stop_service.bat |

List of files for directory
\Loggerapp_service_and_8T1_code\Configurator\Servers\DliService\
DLiServiceConsole

| Creation | Date | Size | File Name |
|---|---|---|---|
| Aug. 4, 2004 | 12:00 AM | 2,426 | AssemblyInfo.cs |
| Aug. 4, 2004 | 12:00 AM | 614 | Class1.cs |
| Aug. 4, 2004 | 12:00 AM | 919 | DLiServiceConsole.sln |
| Sep. 21, 2007 | 09:42 PM | 1,480 | ServiceConsole.cs |
| Mar. 17, 2007 | 02:49 PM | 917 | app.config |
| Sep. 19, 2006 | 10:23 PM | 842 | app.old |

List of files for directory
\Loggerapp_service_and_8T1_code\Configurator\Servers\DliService\
LoggerServer

| Creation | Date | Size | File Name |
|---|---|---|---|
| Sep. 11, 2006 | 02:27 AM | 496 | LoggerServer.cpp |
| Aug. 19, 2004 | 12:00 AM | 2,279 | LoggerServer.rc |
| Aug. 19, 2004 | 12:00 AM | 129 | LoggerServer.rgs |
| May 23, 2006 | 09:16 PM | 2,672 | LoggerServer.sln |
| Nov. 25, 2008 | 03:08 PM | 24,752 | LoggerServer.vcproj |
| Nov. 26, 2008 | 02:46 AM | 1,407 | LoggerServer.vcproj.ACER-KIDUYS8U77.brom. user |
| Nov. 28, 2006 | 12:46 AM | 1,387 | LoggerServer.vcproj.HOME1.Brom.user |
| Nov. 21, 2006 | 05:43 PM | 4,422 | LoggerServerPS.vcproj |
| Nov. 26, 2008 | 02:46 AM | 1,407 | LoggerServerPS.vcproj.ACER-KIDUYS8U77.brom. user |
| Nov. 28, 2006 | 12:46 AM | 1,387 | LoggerServerPS.vcproj.HOME1.Brom.user |
| Aug. 19, 2004 | 12:00 AM | 206 | LoggerServerps.def |
| Aug. 20, 2004 | 12:00 AM | 164 | MessageQueue.cpp |
| Aug. 20, 2004 | 12:00 AM | 870 | MessageQueue.h |
| Aug. 19, 2004 | 12:00 AM | 3,029 | ReadMe.txt |
| Nov. 7, 2008 | 09:35 AM | 41,584 | RealTimeLogger.cpp |
| Jan. 29, 2008 | 11:52 PM | 13,569 | RealTimeLogger.h |
| Aug. 19, 2004 | 12:00 AM | 486 | Resource.h |
| Nov. 26, 2008 | 02:46 AM | 41,503 | _LoggerServer.h |
| Nov. 26, 2008 | 02:46 AM | 6,956 | _LoggerServer.idl |
| Nov. 26, 2008 | 02:46 AM | 2,178 | _LoggerServer_i.c |
| Nov. 26, 2008 | 02:46 AM | 50,970 | _LoggerServer_p.c |
| Nov. 26, 2008 | 02:46 AM | 847 | dlldata.c |
| Aug. 19, 2004 | 12:00 AM | 208 | stdafx.cpp |
| Aug. 19, 2004 | 12:00 AM | 1,629 | stdafx.h |

List of files for directory
\Loggerapp_service_and_8T1_code\I_IPPCallAnalysis

| Creation | Date | Size | File Name |
|---|---|---|---|
| Jul. 14, 2006 | 03:11 PM | 6, 298 | CallAnalysisParam.h |
| Apr. 27, 2006 | 04:34 PM | 5,784 | Configuring_IPPCallAnalysis.txt |
| Jul. 1, 2006 | 10:19 AM | 1,070 | CountriesTones.h |
| Apr. 2, 2006 | 03:24 AM | 1,109 | DecodingRules.h |
| Jun. 15, 2007 | 09:08 PM | 13,054 | IPPCallAnalysisConfig.h |
| Apr. 4, 2006 | 10:43 AM | 5,214 | I_IPPCallAnalysis.h |
| Jun. 15, 2007 | 09:25 PM | 5,958 | I_IPPCallAnalysisConfig.h |
| Feb. 13, 2006 | 06:38 PM | 436 | I_IPPCallAnalysisErrors.h |
| Apr. 4, 2006 | 02:40 PM | 274 | I_IPPCallAnalysisGuid.cpp |
| Feb. 9, 2006 | 07:54 PM | 1,816 | I_IPPCallAnalysisImplementation.cpp |

List of files for directory
\Loggerapp_service_and_8T1_code\com_2\COMLib

| Creation | Date | Size | File Name |
|---|---|---|---|
| Feb. 16, 2005 | 04:43 AM | 4,012 | COMLIB.dsp |
| Feb. 16, 2005 | 04:43 AM | 535 | COMLIB.dsw |
| Feb. 16, 2005 | 04:43 AM | 50 | copy_src.bat |
| Feb. 16, 2005 | 04:43 AM | 184 | exclude.txt |

-continued

| \multicolumn{4}{c}{List of files for directory \Loggerapp_service_and_8T1_code\com_2\COMLib\INCLUDE} | | | |
|---|---|---|---|
| Creation | Date | Size | File Name |
| Jul. 21, 2005 | 03:28 PM | 752 | AbstractInterfaceDefinition.old |
| Feb. 16, 2005 | 04:43 AM | 2,698 | CFACTORY.H |
| Feb. 16, 2005 | 04:43 AM | 2,957 | Cunknown.h |
| Feb. 16, 2005 | 04:43 AM | 872 | EmptyIUnknown.h |
| Feb. 16, 2005 | 04:43 AM | 749 | InClassInterfaceDefinition.old |
| Jul. 21, 2005 | 03:27 PM | 488 | InterfaceDefinition.old |
| Apr. 4, 2006 | 11:34 AM | 920 | InterfaceUtils.old |
| Feb. 16, 2005 | 04:43 AM | 743 | OutClassInterfaceDefinition.old |
| Feb. 16, 2005 | 04:43 AM | 3,975 | PTR.H |
| Feb. 16, 2005 | 04:43 AM | 799 | Registry.H |

| \multicolumn{4}{c}{List of files for directory \Loggerapp_service_and_8T1_code\com_2\COMLib\SOURCES} | | | |
|---|---|---|---|
| Creation | Date | Size | File Name |
| May 23, 2005 | 01:45 PM | 5,264 | Cfactory.cpp |
| Feb. 16, 2005 | 04:43 AM | 2,467 | Cunknown.cpp |
| Feb. 16, 2005 | 04:43 AM | 8,134 | Registry.cpp |

| \multicolumn{4}{c}{List of files for directory \Loggerapp_service_and_8T1_code\com_2\DeviceAdapters\Common} | | | |
|---|---|---|---|
| Creation | Date | Size | File Name |
| Feb. 16, 2005 | 04:44 AM | 323 | CommonAdaptersConst.h |
| Feb. 16, 2005 | 04:44 AM | 4,659 | CommonDeviceConfig.h |
| Feb. 16, 2005 | 04:44 AM | 903 | CommonDrvioctl.h |
| Feb. 16, 2005 | 04:44 AM | 474 | CommonInformationEvents.h |
| Jan. 19, 2006 | 03:36 AM | 1,983 | CommonInformationNotificator.h |
| Feb. 16, 2005 | 04:44 AM | 2 | DriverDebugSchem.cpp |
| Feb. 12, 2008 | 12:30 PM | 1,100 | DriverDebugSchem.h |
| Feb. 16, 2005 | 04:44 AM | 1,085 | DriverTypes.h |
| Feb. 16, 2005 | 04:44 AM | 2,043 | IOCTL_COMMON_INTERFACE.H |
| Feb. 16, 2005 | 04:44 AM | 1,349 | IOCTL_COMMON_INTERFACE_HIGH_LEVEL.H |
| Jun. 12, 2008 | 12:26 PM | 8,228 | ParameterInformationRequest.h |
| Jun. 2, 2008 | 09:57 PM | 766 | RegUtils.H |
| Jun. 2, 2008 | 09:56 PM | 8,526 | RegUtils.cpp |
| Mar. 5, 2005 | 01:34 PM | 11,642 | TransferingQueue.h |
| Feb. 16, 2005 | 04:44 AM | 303 | USBCommonDrvConst.h |
| Feb. 16, 2005 | 04:44 AM | 512 | USBEventHandler.h |
| Feb. 16, 2005 | 04:44 AM | 409 | VersionDescription.h |
| Feb. 16, 2005 | 04:44 AM | 1,344 | mulaw.cpp |
| Apr. 7, 2008 | 08:49 AM | 5,569 | u_law.cpp |
| Apr. 7, 2008 | 08:49 AM | 572 | u_law.h |

| \multicolumn{4}{c}{List of files for directory \Loggerapp_service_and_8T1_code\com_2\DeviceAdapters\Interfaces} | | | |
|---|---|---|---|
| Creation | Date | Size | File Name |
| Feb. 16, 2005 | 04:46 AM | 256 | ErrorDefinition.h |
| Sep. 12, 2008 | 09:51 AM | 4,588 | IAudioLoggerAdapter.h |
| Feb. 16, 2005 | 04:46 AM | 274 | IAudioLoggerAdapterGuid.cpp |
| Aug. 16, 2007 | 11:03 PM | 6,650 | IAudioLoggerAdapterImplementation.cpp |
| Jul. 26, 2005 | 12:34 PM | 2,345 | IAudioLoggerAdapter_errors.h |
| Jul. 19, 2007 | 11:41 AM | 913 | IFilter.h |
| Jul. 18, 2007 | 09:48 PM | 251 | IFilterGuid.cpp |
| Jul. 18, 2007 | 10:13 PM | 630 | IFilterImplementation.cpp |
| Jul. 21, 2005 | 12:27 PM | 1,106 | audiologgertypes.h |
| Feb. 16, 2005 | 04:46 AM | 198 | boperations.h |
| Jul. 21, 2005 | 09:53 AM | 312 | devicestates.h |
| Jul. 21, 2005 | 09:54 AM | 167 | voxstates.h |

| \multicolumn{4}{c}{List of files for directory \Loggerapp_service_and_8T1_code\com_2\DeviceAdapters\ USB8T1AudioLogger\ADSP-BF561 INIT CODE} | | | |
|---|---|---|---|
| Creation | Date | Size | File Name |
| Nov. 26, 2008 | 02:58 AM | 4,683 | ADSP-BF561 INIT CODE.dpj |
| Jan. 28, 2007 | 05:21 PM | 790 | ADSP-BF561 INIT CODE.ldf |

-continued

| Oct. 12, 2007 | 05:25 PM | 2,039 | ADSP-BF561 INIT CODE.mak |
| Jan. 28, 2007 | 05:18 PM | 2,779 | Init_Code.asm |

List of files for directory
\Loggerapp_service_and_8T1_code\com_2\DeviceAdapters\
USB8T1AudioLogger\TXC_06830_SDRV_SC_ed_2_0\TestTepro

| Creation | Date | Size | File Name |
| --- | --- | --- | --- |
| Jan. 20, 2008 | 05:20 PM | 4,229 | IORegToFile.c |
| Oct. 13, 2007 | 11:58 PM | 1,318 | ReadMe.txt |
| Jan. 19, 2008 | 11:58 PM | 3,434 | TestTepro.cpp |
| Jan. 17, 2008 | 02:59 PM | 14,009 | TestTepro.vcproj |
| Jan. 21, 2008 | 01:07 PM | 1,433 | TestTepro.vcproj.ACER-KIDUYS8U77.brom. user |
| Jan. 20, 2008 | 09:16 PM | 2,874 | io_trace.txt |
| Jan. 20, 2008 | 07:46 PM | 538 | reg_on_input.txt |
| Oct. 13, 2007 | 11:58 PM | 296 | stdafx.cpp |
| Oct. 13, 2007 | 11:58 PM | 376 | stdafx.h |

List of files for directory
\Loggerapp_service_and_8T1_code\com_2\DeviceAdapters\
USB8T1AudioLogger\TXC_0683-6_SDRV_SC_ed_2_0\docs

| Creation | Date | Size | File Name |
| --- | --- | --- | --- |
| Apr. 20, 2006 | 06:30 PM | 144,807 | TXC_06830_SDRV_PI_ed_2.pdf |
| May 5, 2006 | 02:25 PM | 87,800 | TXC_06830_SDRV_RN_ed_2.pdf |

List of files for directory
\Loggerapp_service_and_8T1_code\com_2\DeviceAdapters\
USB8T1AudioLogger\TXC_06830_SDRV_SC_ed_2_0\mbox_retranslator

| Creation | Date | Size | File Name |
| --- | --- | --- | --- |
| Oct. 9, 2007 | 11:42 AM | 9,065 | txc_tepro_physical_retranslator.c |

List of files for directory
\Loggerapp_service_and_8T1_code\com_2\DeviceAdapters\
USB8T1AudioLogger\TXC_06830_SDRV_SC_ed_2_0\src\OsPlatform

| Creation | Date | Size | File Name |
| --- | --- | --- | --- |
| Sep. 20, 2005 | 09:37 AM | 8,320 | txc_error.h |
| Aug. 9, 2005 | 09:17 AM | 3,158 | txc_generic.h |
| Aug. 9, 2005 | 09:17 AM | 5,041 | txc_os_mem_mgmt.c |
| Apr. 18, 2006 | 06:45 PM | 2,627 | txc_os_mem_mgmt.h |
| Dec. 21, 2005 | 12:01 PM | 2,937 | txc_os_platform.h |
| Jan. 20, 2008 | 08:59 PM | 15,394 | txc_os_queue.c |
| Apr. 18, 2006 | 08:36 PM | 3,101 | txc_os_queue.h |
| Jan. 17, 2008 | 08:36 PM | 14,433 | txc_os_sem.c |
| Apr. 18, 2006 | 08:38 PM | 2,851 | txc_os_sem.h |
| Jan. 17, 2008 | 08:30 PM | 15,076 | txc_os_sem.old |
| Jan. 17, 2008 | 08:18 PM | 10,522 | txc_os_signal.c |
| Apr. 18, 2006 | 09:48 PM | 2,617 | txc_os_signal.h |
| Jan. 17, 2008 | 11:43 PM | 15,265 | txc_os_task.c |
| Apr. 18, 2006 | 08:40 PM | 3,148 | txc_os_task.h |
| Jan. 17, 2008 | 08:33 PM | 4,755 | txc_plaform.h |

List of files for directory
\Loggerapp_service_and_8T1_code\com_2\DeviceAdapters\
USB8T1AudioLogger\TXC_06830_SDRV_SC_ed_2_0\src\driver

| Creation | Date | Size | File Name |
| --- | --- | --- | --- |
| Jan. 17, 2008 | 12:04 AM | 3,526 | txc_tepro_api.h |
| Jan. 17, 2003 | 04:15 PM | 5,786 | txc_tepro_api_callback.h |
| Mar. 17, 2006 | 01:02 PM | 28,960 | txc_tepro_api_defines.h |
| Jan. 17, 2003 | 04:15 PM | 2,922 | txc_tepro_api_error.h |
| Mar. 17, 2006 | 01:03 PM | 24,403 | txc_tepro_api_proto.h |
| May 1, 2006 | 04:03 PM | 21,227 | txc_tepro_api_struct.h |
| Oct. 16, 2007 | 02:04 PM | 55,630 | txc_tepro_async_notify.c |
| Sep. 27, 2005 | 03:18 PM | 3,664 | txc_tepro_async_notify.h |
| Oct. 14, 2007 | 06:41 PM | 25,369 | txc_tepro_buffer_mgmt.c |
| Oct. 13, 2005 | 04:44 PM | 6,685 | txc_tepro_buffer_mgmt.h |
| Oct. 12, 2005 | 06:47 PM | 41,564 | txc_tepro_dart_config_api.c |
| Feb. 22, 2006 | 03:22 PM | 21,032 | txc_tepro_database.c |
| Feb. 22, 2006 | 03:55 PM | 8,759 | txc_tepro_database.h |
| Jan. 17, 2008 | 12:00 AM | 32,092 | txc_tepro_debug_api.c |

-continued

| | | | |
|---|---|---|---|
| Jan. 17, 2008 | 12:01 AM | 22,064 | txc_tepro_device_mgmt_api.c |
| Apr. 18, 2006 | 10:13 AM | 12,129 | txc_tepro_driver_mgmt_api.c |
| Oct. 17, 2005 | 02:24 PM | 93,422 | txc_tepro_ds1_config_api.c |
| Mar. 16, 2006 | 11:34 AM | 26,745 | txc_tepro_ds1_control_api.c |
| Apr. 27, 2006 | 04:47 PM | 49,295 | txc_tepro_ds1_mgmt_api.c |
| Oct. 13, 2005 | 03:22 PM | 89,637 | txc_tepro_ds3_config_api.c |
| Oct. 7, 2005 | 01:46 PM | 25,648 | txc_tepro_ds3_control_api.c |
| May 1, 2006 | 04:00 PM | 22,887 | txc_tepro_ds3_mgmt_api.c |
| Mar. 17, 2006 | 01:03 PM | 86,038 | txc_tepro_dsc_config_api.c |
| Oct. 8, 2005 | 04:21 PM | 10,098 | txc_tepro_dsc_control_api.c |
| Apr. 28, 2006 | 10:59 AM | 29,957 | txc_tepro_firm_mgmt_api.c |
| Oct. 13, 2005 | 09:09 AM | 19,210 | txc_tepro_hdlc_config_api.c |
| Oct. 13, 2005 | 03:33 PM | 26,508 | txc_tepro_m13_config_api.c |
| Mar. 16, 2006 | 05:24 PM | 97,342 | txc_tepro_msg_defines.h |
| Mar. 9, 2006 | 01:26 PM | 67,282 | txc_tepro_msg_id.h |
| Apr. 20, 2006 | 01:24 PM | 4,870 | txc_tepro_plaform.h |
| Jan. 31, 2006 | 04:40 PM | 15,756 | txc_tepro_utilities.c |
| Sep. 28, 2005 | 01:16 PM | 4,047 | txc_tepro_utilities.h |

List of files for directory
\Loggerapp_service_and_8T1_code\com_2\DeviceAdapters\
USB8T1AudioLogger\TXC_06830_SDRV_SC_ed_2_0\src\linuxonly\addon

| Creation | Date | Size | File Name |
|---|---|---|---|
| Apr. 19, 2006 | 01:30 PM | 2,857 | txc_host_hw_platform.c |
| Nov. 1, 2005 | 04:35 PM | 2,225 | txc_host_hw_platform.h |
| May 17, 2005 | 12:13 PM | 2,473 | txc_linux_ioctl.h |
| Nov. 6, 2005 | 03:18 PM | 12,860 | txc_os_driver.c |
| Apr. 19, 2006 | 01:28 PM | 2,473 | txc_os_driver.h |

List of files for directory
\Loggerapp_service_and_8T1_code\com_2\DeviceAdapters\
USB8T1AudioLogger\TXC_06830_SDRV_SC_ed_2_0\src\linuxonly\kernel_drv

| Creation | Date | Size | File Name |
|---|---|---|---|
| Nov. 2, 2005 | 12:16 PM | 746 | Makefile |
| Apr. 19, 2006 | 02:57 PM | 23,840 | txc_linux_drv.c |
| Oct. 31, 2005 | 02:29 PM | 2,976 | txc_linux_drv.h |

List of files for directory
\Loggerapp_service_and_8T1_code\com_2\DeviceAdapters\
USB8T1AudioLogger\TXC_06830_SDRV_SC_ed_2_0\src\mboxpal

| Creation | Date | Size | File Name |
|---|---|---|---|
| Oct. 13, 2005 | 03:34 PM | 4,200 | txc_tepro_pal_isr.c |
| Nov. 7, 2005 | 03:29 PM | 7,422 | txc_tepro_pal_reg_defines.h |
| Jan. 16, 2008 | 06:52 PM | 61,509 | txc_tepro_physical_adapt.c |
| May 9, 2006 | 10:35 AM | 5,977 | txc_tepro_physical_adapt.h |

List of files for directory
\Loggerapp_service_and_8T1_code\com_2\DeviceAdapters\
USB8T1AudioLogger\TXC_06830_SDRV_SC_ed_2_0\txc

| Creation | Date | Size | File Name |
|---|---|---|---|
| Sep. 20, 2007 | 08:49 PM | 9,863 | txc.dsp |
| Sep. 17, 2007 | 11:55 AM | 529 | txc.dsw |
| Jan. 19, 2008 | 12:46 PM | 13,333 | txc.plg |

List of files for directory
\Loggerapp_service_and_8T1_code\com_2\DeviceAdapters\
USB8T1AudioLogger\TXC_06830_SDRV_SC_ed_2_0\txc\Debug

| Creation | Date | Size | File Name |
|---|---|---|---|
| Jan. 19, 2008 | 12:46 PM | 207 | txc_os_driver.sbr |

List of files for directory
\Loggerapp_service_and_8T1_code\com_2\DeviceAdapters\
USB8T1AudioLogger\USB8T1

| Creation | Date | Size | File Name |
|---|---|---|---|
| Aug. 16, 2007 | 09:46 PM | 240 | CLSID_USB8T1.CPP |
| Aug. 16, 2007 | 09:46 PM | 154 | CLSID_USB8T1.H |
| Aug. 24, 2007 | 11:27 AM | 7,308 | ChannelLevelAdapter.cpp |

-continued

| Aug. 24, 2007 | 09:32 AM | 2,961 | ChannelLevelAdapter.h |
| Aug. 20, 2007 | 09:50 PM | 221 | CommonDefinitions.h |
| Sep. 15, 2008 | 12:22 PM | 13,975 | IAudioLoggerAdapterImplementation.cpp |
| Aug. 16, 2007 | 10:32 PM | 414 | InterfaceDefinition.h |
| Aug. 16, 2007 | 09:46 PM | 221 | InterfaceIncludes.h |
| Aug. 16, 2007 | 09:46 PM | 30 | REDEBUG.BAT |
| Aug. 16, 2007 | 09:46 PM | 33 | RERELEAS.BAT |
| Aug. 16, 2007 | 09:46 PM | 137 | SearchInterfaceMacros.h |
| Aug. 16, 2007 | 09:46 PM | 1,439 | Server.cpp |
| Aug. 16, 2007 | 09:46 PM | 264 | USB8T1.DEF |
| Aug. 24, 2007 | 09:42 AM | 7,706 | USB8T1.cpp |
| Nov. 26, 2008 | 01:51 AM | 6,579 | USB8T1.dsp |
| Nov. 26, 2008 | 01:10 AM | 1,175 | USB8T1.dsw |
| Aug. 19, 2007 | 02:49 PM | 2,060 | USB8T1.h |
| Nov. 26, 2008 | 01:48 AM | 7,249 | USB8T1.plg |
| Aug. 21, 2007 | 11:12 AM | 6,079 | USB8T1Config.cpp |
| Aug. 20, 2007 | 11:24 PM | 9,235 | USB8T1Config.h |
| Aug. 16, 2007 | 09:46 PM | 176 | attention.txt |
| Aug. 19, 2007 | 02:34 PM | 126 | usb8T1_version.h |

List of files for directory
\Loggerapp_service_and_8T1_code\com_2\DeviceAdapters\USB8T1AudioLogger\USB8T1_framework_v12

| Creation | Date | Size | File Name |
|---|---|---|---|
| May 26, 2006 | 12:31 AM | 22,325 | adi_m29w64d.c |
| May 26, 2006 | 12:31 AM | 1,428 | adi_m29w64d.h |
| Apr. 15, 2007 | 11:28 PM | 84 | dummy.c |
| Oct. 12, 2007 | 04:20 PM | 140,378 | linker_log.xml |
| Nov. 26, 2008 | 02:58 AM | 1,209 | main.dpg |
| Nov. 26, 2008 | 02:58 AM | 11,087 | main.dpj |
| Sep. 6, 2007 | 01:01 AM | 34,082 | main.ldf |
| Oct. 12, 2007 | 04:19 PM | 4,969 | main.mak |
| Oct. 12, 2007 | 04:20 PM | 1,004,005 | main.map.xml |
| Sep. 6, 2007 | 01:01 AM | 10,041 | main_basiccrt.s |
| Sep. 6, 2007 | 01:01 AM | 2,121 | main_heaptab.c |

List of files for directory
\Loggerapp_service_and_8T1_code\com_2\DeviceAdapters\USB8T1AudioLogger\USB8T1_framework_V12\Common

| Creation | Date | Size | File Name |
|---|---|---|---|
| Oct. 12, 2007 | 01:07 PM | 5,584 | CoreaDLM.c |
| Aug. 20, 2007 | 01:06 AM | 2,155 | CorebDLM.c |
| Sep. 3, 2007 | 11:57 PM | 1,368 | DynFramework.h |
| Aug. 6, 2007 | 09:10 PM | 7,100 | LoadFlat.c |
| Aug. 23, 2005 | 10:25 AM | 2,622 | LoadFlat.h |
| Aug. 13, 2007 | 12:34 PM | 1,190 | MakeDataStream.c |
| Aug. 11, 2007 | 03:53 PM | 5,803 | SendDataStream.c |
| Aug. 4, 2007 | 06:41 PM | 911 | UART_Trace.c |
| Aug. 11, 2007 | 10:03 AM | 1,391 | UART_Trace.h |
| May 9, 2005 | 04:06 PM | 302 | export.h |
| Sep. 6, 2007 | 01:15 AM | 20,652 | ezkitutilities.c |
| Jun. 26, 2007 | 08:53 AM | 2,027 | ezkitutilities.h |
| Aug. 15, 2007 | 06:57 PM | 865 | l2_variables.h |
| Sep. 6, 2007 | 09:28 AM | 30,432 | m29w64d.c |
| Sep. 5, 2007 | 12:56 AM | 669 | sdram_variables.h |

List of files for directory
\Loggerapp_service_and_8T1_code\com_2\DeviceAdapters\USB8T1AudioLogger\USB8T1_framework_v12\DLM

| Creation | Date | Size | File Name |
|---|---|---|---|
| Nov. 26, 2008 | 02:58 AM | 10,455 | DLM.dpj |
| Jun. 24, 2007 | 12:48 AM | 1,448 | DLM.ldf |
| Nov. 26, 2008 | 02:58 AM | 3,810 | DLM.mak |
| Aug. 13, 2007 | 11:07 AM | 596 | DynFramework.c |

List of files for directory
\Loggerapp_service_and_8T1_code\com_2\DeviceAdapters\USB8T1AudioLogger\USB8T1_framework_v12\coreA

| Creation | Date | Size | File Name |
|---|---|---|---|
| Nov. 26, 2008 | 02:58 AM | 5,581 | coreA.dpj |
| Oct. 12, 2007 | 04:19 PM | 5,030 | coreA.mak |

-continued

| Aug. 14, 2007 | 12:27 PM | 5,882 | loopback.c |
| Sep. 5, 2007 | 01:05 AM | 11,397 | main_A.c |

List of files for directory
\Loggerapp_service_and_8T1_code\com_2\DeviceAdapters\
USB8T1AudioLogger\USB8T1_framework_v12\coreB

| Creation | Date | Size | File Name |
| --- | --- | --- | --- |
| Nov. 26, 2008 | 02:58 AM | 6,045 | coreB.dpj |
| Oct. 12, 2007 | 04:19 PM | 6,125 | coreB.mak |
| Aug. 11, 2007 | 01:12 PM | 651 | coreB_buffer_structure.h |
| Sep. 6, 2007 | 10:54 AM | 4,089 | main_B.c |

List of files for directory
\Loggerapp_service_and_8T1_code\com_2\DeviceAdapters\
USB8T1AudioLogger\USB8T1_framework_v12\sm12

| Creation | Date | Size | File Name |
| --- | --- | --- | --- |
| Aug. 14, 2007 | 08:35 PM | 836 | sm12.c |
| Nov. 26, 2008 | 02:58 AM | 4,035 | sm12.dpj |
| Nov. 26, 2008 | 02:58 AM | 1,742 | sm12.mak |

List of files for directory
\Loggerapp_service_and_8T1_code\com_2\DeviceAdapters\
USB8T1AudioLogger\USB8T1_Framework_v12\sm13

| Creation | Date | Size | File Name |
| --- | --- | --- | --- |
| Sep. 5, 2007 | 12:52 AM | 757 | sm13.c |
| Nov. 26, 2008 | 02:58 AM | 4,198 | sm13.dpj |
| Nov. 26, 2008 | 02:58 AM | 2,101 | sm13.mak |

List of files for directory
\Loggerapp_service_and_8T1_code\com_2\DeviceAdapters\
USB8T1AudioLogger\common

| Creation | Date | Size | File Name |
| --- | --- | --- | --- |
| Aug. 24, 2007 | 11:06 AM | 16,253 | USB8T1DriverAdapter.cpp |
| Aug. 24, 2007 | 10:24 AM | 6,233 | USB8T1DriverAdapter.h |
| Aug. 24, 2007 | 10:24 AM | 24,907 | USB8T1DriverAdapterSM.cpp |
| May 26, 2006 | 12:31 AM | 715 | adiguid.h |
| Aug. 20, 2007 | 01:06 AM | 441 | usb8t1_frame_structure.h |
| Oct. 12, 2007 | 12:52 PM | 6,025 | usbcmd.h |

List of files for directory
\Loggerapp_service_and_8T1_code\com_2\ThreadLib\proj

| Creation | Date | Size | File Name |
| --- | --- | --- | --- |
| Feb. 16, 2005 | 05:08 AM | 5,323 | ThreadLib.dsp |
| Feb. 16, 2005 | 05:08 AM | 541 | ThreadLib.dsw |
| Feb. 21, 2005 | 11:01 PM | 2,108 | ThreadLib.plg |
| Feb. 16, 2005 | 05:08 AM | 5,089 | ThreadLibDll.dsp |
| Feb. 16, 2005 | 05:08 AM | 2,082 | ThreadLibDll.plg |
| Feb. 16, 2005 | 05:08 AM | 5,089 | ThreadLibDll_NET.dsp |
| Nov. 21, 2006 | 05:43 PM | 12,130 | ThreadLibDll_NET.vcproj |
| Nov. 26, 2008 | 02:46 AM | 1,407 | ThreadLibDll_NET.vcproj.ACER-KIDUYS8U77.brom.user |
| Nov. 23, 2006 | 11:01 PM | 1,387 | ThreadLibDll_NET.vcproj.HOME1.Brom.user |
| Feb. 16, 2005 | 05:08 AM | 11,115 | ThreadLibExe_NET.vcproj |

List of files for directory
\Loggerapp_service_and_8T1_code\com_2\ThreadLib\proj\include

| Creation | Date | Size | File Name |
| --- | --- | --- | --- |
| Feb. 16, 2005 | 05:07 AM | 600 | CMcl.h |
| Feb. 16, 2005 | 05:07 AM | 751 | CMclAutoLock.h |
| Feb. 16, 2005 | 05:07 AM | 3,127 | CMclAutoPtr.h |
| Feb. 16, 2005 | 05:07 AM | 746 | CMclCritSec.h |
| Feb. 16, 2005 | 05:07 AM | 944 | CMclEvent.h |
| Feb. 16, 2005 | 05:07 AM | 3,006 | CMclGlobal.h |
| Feb. 16, 2005 | 05:07 AM | 1,573 | CMclKernel.h |
| Feb. 16, 2005 | 05:07 AM | 8,844 | CMclLinkedLists.h |
| Feb. 16, 2005 | 05:07 AM | 3,785 | CMclMailbox.h |
| Feb. 16, 2005 | 05:07 AM | 2,373 | CMclMonitor.h |

| Feb. 16, 2005 | 05:07 AM | 875 | CMclMutex.h |
| Feb. 16, 2005 | 05:07 AM | 976 | CMclSemaphore.h |
| Feb. 16, 2005 | 05:07 AM | 1,759 | CMclSharedMemory.h |
| Feb. 16, 2005 | 05:07 AM | 2,410 | CMclThread.h |
| Feb. 16, 2005 | 05:07 AM | 1,629 | CMclWaitableCollection.h |
| Feb. 16, 2005 | 05:07 AM | 1,065 | CMclWaitableObject.h |
| Feb. 16, 2005 | 05:07 AM | 2,166 | LockableQueue.h |

List of files for directory
\Loggerapp_service_and_8T1_code\com_2\ThreadLib\proj\src

| Creation | Date | Size | File Name |
| --- | --- | --- | --- |
| Feb. 16, 2005 | 05:08 AM | 1,492 | CMclAutoLock.cpp |
| Feb. 16, 2005 | 05:08 AM | 1,613 | CMclAutoPtr.cpp |
| Feb. 16, 2005 | 05:08 AM | 752 | CMclCritSec.cpp |
| Feb. 16, 2005 | 05:08 AM | 1,317 | CMclEvent.cpp |
| Feb. 16, 2005 | 05:08 AM | 649 | CMclGlobal.cpp |
| Feb. 16, 2005 | 05:08 AM | 1,372 | CMclKernel.cpp |
| Feb. 16, 2005 | 05:08 AM | 13,089 | CMclMailbox.cpp |
| Feb. 16, 2005 | 05:08 AM | 6,198 | CMclMonitor.cpp |
| Feb. 16, 2005 | 05:08 AM | 1,176 | CMclMutex.cpp |
| Feb. 16, 2005 | 05:08 AM | 1,453 | CMclSemaphore.cpp |
| Feb. 16, 2005 | 05:08 AM | 2,754 | CMclSharedMemory.cpp |
| Sep. 30, 2006 | 01:38 PM | 2,789 | CMclThread.cpp |
| Feb. 16, 2005 | 05:08 AM | 2,453 | CMclWaitableCollection.cpp |
| Feb. 16, 2005 | 05:08 AM | 15,435 | Mcl.mak |

List of files for directory
\Loggerapp_service_and_8T1_code\com_2\common

| Creation | Date | Size | File Name |
| --- | --- | --- | --- |
| Sep. 11, 2008 | 11:30 PM | 41,651 | COMPortAdapter.cpp |
| Aug. 23, 2008 | 11:51 PM | 5,414 | COMPortAdapter.h |
| Feb. 16, 2005 | 04:43 AM | 4,061 | ClassImplementation.h |
| Feb. 16, 2005 | 04:43 AM | 3,055 | CommonClassImplementation.h |
| Feb. 16, 2005 | 04:43 AM | 228 | ConsoleDebugSchem.h |
| Nov. 12, 2008 | 03:22 PM | 4,242 | DLI_CSVSerializer.cpp |
| Nov. 2, 2008 | 12:09 PM | 708 | DLI_CSVSerializer.h |
| Nov. 21, 2008 | 03:23 PM | 8,523 | DLI_Header_Parameters.h |
| Nov. 11, 2008 | 02:25 AM | 3,212 | DLI_PGSerializer.cpp |
| Nov. 2, 2008 | 12:09 PM | 812 | DLI_PGSerializer.h |
| Jun. 9, 2008 | 03:33 PM | 5,424 | DLI_XMLSerializer.cpp |
| Jun. 6, 2008 | 12:03 PM | 767 | DLI_XMLSerializer.h |
| Oct. 20, 2008 | 03:02 PM | 4,455 | DTMFDialing_22050Hz8bit.cpp |
| Feb. 16, 2005 | 04:43 AM | 1,221 | DTMFDialing_22050Hz8bit.h |
| Oct. 20, 2008 | 03:04 PM | 4,739 | DTMFDialing_32000Hz8bit.cpp |
| Feb. 16, 2005 | 04:43 AM | 1,221 | DTMFDialing_32000Hz8bit.h |
| Nov. 12, 2006 | 07:16 PM | 8,630 | DeviceConfig.h |
| Nov. 12, 2006 | 06:32 PM | 8,671 | DeviceConfig.old |
| Feb. 16, 2005 | 05:02 AM | 2,649 | ErrMsgApp.h |
| Feb. 16, 2005 | 04:43 AM | 2,572 | ErrMsgApp.old |
| Oct. 25, 2008 | 12:19 AM | 21,044 | FTD2XX_Adapter.cpp |
| Oct. 25, 2008 | 12:21 AM | 2,170 | FTD2XX_Adapter.h |
| Dec. 17, 2007 | 06:56 PM | 1,865 | FTD2XX_Stub.h |
| Sep. 21, 2005 | 01:44 AM | 3,731 | Fifo.cpp |
| Sep. 21, 2005 | 12:57 AM | 576 | Fifo.h |
| Jul. 7, 2008 | 06:36 PM | 1,346 | GlobalEventsOops.cpp |
| Jul. 6, 2008 | 09:04 PM | 307 | GlobalEventsOops.h |
| Mar. 15, 2008 | 10:35 AM | 21,408 | HS_enum.cpp |
| Nov. 26, 2007 | 09:14 PM | 206 | HS_enum.h |
| Feb. 16, 2005 | 04:43 AM | 493 | IAdapter.h |
| Apr. 23, 2008 | 09:17 PM | 4,682 | IFTD2XX.H |
| Feb. 16, 2005 | 04:43 AM | 283 | IPhoneLineStateAdapter.h |
| Sep. 30, 2006 | 10:16 AM | 8,258 | LocalDebugSchem.h |
| Feb. 16, 2005 | 04:43 AM | 2,548 | LocalDebugSchem.old |
| Sep. 16, 2006 | 04:17 PM | 5,668 | LocalDebugSchem.old1 |
| Jun. 12, 2008 | 05:57 PM | 3,133 | LogMacrosDefinition.h |
| Sep. 30, 2006 | 10:29 AM | 286 | LogMessageTypes.h |
| Oct. 29, 2008 | 06:03 PM | 1,632 | LoggerParameterRequests.h |
| Feb. 16, 2005 | 04:43 AM | 851 | MemoryImage.h |
| Jul. 15, 2008 | 11:34 PM | 4,009 | Message.h |
| Dec. 22, 2007 | 04:59 PM | 2,651 | Message.old |
| Apr. 4, 2005 | 02:06 PM | 992 | MutexLocker.cpp |
| Feb. 16, 2005 | 04:44 AM | 1,245 | MutexLocker.h |
| Feb. 16, 2005 | 04:44 AM | 207 | ObjectDefinition.h |
| Nov. 5, 2007 | 01:47 PM | 15,133 | PcmDriver.cpp |
| Oct. 18, 2007 | 11:51 PM | 9,385 | PcmDriver.cpp.old |

-continued

| | | | |
|---|---|---|---|
| Nov. 5, 2007 | 01:22 PM | 2,136 | PcmDriver.h |
| Oct. 18, 2007 | 09:57 PM | 1,574 | PcmDriver.h.old |
| Jun. 7, 2005 | 09:19 PM | 8,014 | PhoneLineStateAdapter.cpp |
| Feb. 16, 2005 | 04:44 AM | 2,246 | PhoneLineStateAdapter.h |
| Mar. 11, 2007 | 09:13 PM | 976 | PostMessageRedefinition.h |
| Feb. 16, 2005 | 04:44 AM | 83 | RecurciveException.cpp |
| Feb. 16, 2005 | 04:44 AM | 2,138 | RecurciveException.h |
| Nov. 8, 2005 | 01:54 PM | 576 | SchedulerNotificator.h |
| Sep. 30, 2006 | 09:49 AM | 9,051 | SimpleDebugSchem.h |
| Feb. 16, 2005 | 04:44 AM | 21,658 | USBDescriptors.h |
| Jan. 24, 2006 | 10:45 PM | 2,611 | UlawLib.cpp |
| Feb. 16, 2005 | 04:44 AM | 252 | UlawLib.h |
| Apr. 18, 2006 | 07:22 PM | 576 | VUMeterConfigFromINI.cpp |
| Jan. 29, 2006 | 11:21 PM | 556 | VUMeterConfigFromINI.h |
| Feb. 16, 2005 | 04:44 AM | 909 | WaveHeader_22050Hz8bit.h |
| Feb. 16, 2005 | 04:44 AM | 909 | WaveHeader_32000Hz8bit.h |
| Aug. 28, /2006 | 06:01 PM | 2,027 | WinDebugSchem.cpp |
| Oct. 1, 2007 | 11:07 PM | 9,056 | WinDebugSchem.h |
| Feb. 10, 2006 | 02:09 AM | 522 | base_au_header.h |
| Feb. 22, 2008 | 09:05 PM | 226 | base_dimensions.h |
| Mar. 11, 2007 | 07:56 PM | 6,555 | common.h |
| Mar. 11, 2007 | 12:57 PM | 1,311 | fmteventlog.h |
| Nov. 1, 2008 | 11:21 AM | 8,077 | loggerMacros.h |
| Apr. 9, 2008 | 07:19 PM | 565 | loggerappconst.h |
| Feb. 13, 2007 | 03:55 PM | 1,809 | loggerapptypes.h |
| Oct. 24, 2007 | 11:40 PM | 26,645 | usbid.cpp |
| Feb. 16, 2005 | 04:44 AM | 228 | usbid.h |
| Feb. 16, 2005 | 04:44 AM | 303 | version.h |
| Feb. 16, 2005 | 04:44 AM | 1,306 | virtual_common_variable_length_object.h |
| Feb. 16, 2005 | 04:44 AM | 542 | wavehdrs.h |

List of files for directory
\Loggerapp_service_and_8T1_code\com_2\common\GUI

| Creation | Date | Size | File Name |
|---|---|---|---|
| May 4, 2000 | 05:44 PM | 9,016 | GCColorEdit.cpp |
| Aug. 4, 2005 | 08:34 PM | 7,143 | GCColorEdit.h |
| Nov. 1, 2005 | 09:29 AM | 51,987 | GCMultiFieldEdit.cpp |
| Nov. 1, 2005 | 09:31 AM | 50,143 | GCMultiFieldEdit.h |
| Nov. 1, 2005 | 09:23 AM | 12,047 | GCTimeCtrl.cpp |
| Nov. 1, 2005 | 09:17 AM | 2,943 | GCTimeCtrl.h |
| Aug. 16, 2005 | 05:00 PM | 3,652 | GCWeek.cpp |
| Aug. 13, 2005 | 08:45 AM | 1,664 | GCWeek.h |
| Aug. 24, 2005 | 11:44 AM | 9,955 | LinkedClass.hpp |
| Jul. 14, 2008 | 01:16 PM | 17,551 | TaskBarApplet.cpp |
| Jul. 14, 2008 | 11:54 AM | 6,036 | TaskBarApplet.hpp |
| Jul. 6, 2008 | 10:02 PM | 2,073 | TaskBarAppletMain.hpp |

List of files for directory
\Loggerapp_service_and_8T1_code\com_2\common\XML

| Creation | Date | Size | File Name |
|---|---|---|---|
| Mar. 19, 2005 | 12:22 AM | 279 | FmtLogEventInterface.h |
| Nov. 9, 2005 | 04:19 PM | 423 | NonFmtLogEventInterface.h |
| Feb. 16, 2005 | 04:44 AM | 352 | ParametersTypes.h |
| Jun. 9, 2008 | 03:33 PM | 2,147 | XMLLibrary.cpp |
| Feb. 16, 2005 | 04:44 AM | 430 | XMLLibrary.h |
| Jun. 9, 2008 | 03:33 PM | 1,876 | XMLMacroses.h |
| Jun. 9, 2008 | 03:22 PM | 8,661 | XMLSerializer.h |

List of files for directory
\Loggerapp_service_and_8T1_code\com_2\common\mixapp

| Creation | Date | Size | File Name |
|---|---|---|---|
| Feb. 16, 2005 | 04:43 AM | 10,032 | appport.h |
| Feb. 16, 2005 | 04:43 AM | 5,945 | debug.cpp |
| Feb. 16, 2005 | 04:43 AM | 2,067 | debug.h |
| Feb. 16, 2005 | 04:43 AM | 26,266 | mactrls.cpp |
| Feb. 16, 2005 | 04:43 AM | 808 | macustom.cpp |
| Feb. 16, 2005 | 04:43 AM | 25,283 | mafader.cpp |
| Feb. 16, 2005 | 04:43 AM | 39,134 | mainit.cpp |
| Feb. 16, 2005 | 04:43 AM | 2,755 | makefile |
| Feb. 16, 2005 | 04:43 AM | 16,733 | malines.cpp |
| Feb. 16, 2005 | 04:43 AM | 22,874 | malist.cpp |
| Feb. 16, 2005 | 04:43 AM | 20,274 | mameter.cpp |
| Feb. 16, 2005 | 04:43 AM | 808 | manumber.cpp |

-continued

| | | | |
|---|---|---|---|
| Feb. 16, 2005 | 04:43 AM | 808 | maslider.cpp |
| Feb. 16, 2005 | 04:43 AM | 20,258 | maswitch.cpp |
| Feb. 16, 2005 | 04:44 AM | 806 | matime.cpp |
| Feb. 16, 2005 | 04:44 AM | 32,606 | mixapp.cpp |
| Feb. 16, 2005 | 04:44 AM | 3,910 | mixapp.dsp |
| Feb. 16, 2005 | 04:44 AM | 535 | mixapp.dsw |
| Feb. 16, 2005 | 04:44 AM | 13,113 | mixapp.h |
| Feb. 16, 2005 | 04:44 AM | 51,261 | mixapp.map |
| Feb. 16, 2005 | 04:44 AM | 5,318 | mixapp.plg |
| Feb. 16, 2005 | 04:44 AM | 7,136 | mixapp.rc |
| Feb. 16, 2005 | 04:44 AM | 680 | mixapp.rcv |
| Feb. 16, 2005 | 04:44 AM | 4,489 | muldiv32.h |
| Feb. 16, 2005 | 04:44 AM | 29 | readme.txt |
| Feb. 16, 2005 | 04:44 AM | 17,393 | tlb.cpp |
| Feb. 16, 2005 | 04:44 AM | 2,905 | tlb.h |

List of files for directory
\Loggerapp_service_and_8T1_code\com_2\loggerApp

| Creation | Date | Size | File Name |
|---|---|---|---|
| Apr. 9, 2006 | 06:35 PM | 825 | AuFileInfo.h |
| Jun. 10, 2008 | 01:41 PM | 8,568 | CSVSerializer.h |
| Apr. 15, 2006 | 07:45 PM | 894 | CallAnalysisConfig.cpp |
| Apr. 10, 2008 | 05:59 PM | 428 | CallAnalysisConfig.h |
| Apr. 15, 2006 | 07:48 PM | 1,976 | CallAnalysisConfigManager.cpp |
| Apr. 15, 2006 | 07:47 PM | 1,061 | CallAnalysisConfigManager.h |
| Oct. 29, 2008 | 10:44 PM | 25,283 | CallAnalysisTask.cpp |
| Dec. 12, 2007 | 11:45 PM | 1,653 | CallAnalysisTask.h |
| Oct. 30, 2008 | 12:34 AM | 2,196 | CallInfo.h |
| Sep. 3, 2008 | 09:19 PM | 23,226 | ChannelManager.cpp |
| Sep. 3, 2008 | 09:18 PM | 4,656 | ChannelManager.h |
| Feb. 16, 2005 | 05:02 AM | 183 | ChannelModes.oll |
| Feb. 16, 2005 | 05:02 AM | 174 | ChannelModes.old |
| Sep. 16, 2008 | 04:52 PM | 14,815 | Channels.cpp |
| Sep. 12, 2008 | 11:07 AM | 2,896 | Channels.h |
| Feb. 26, 2006 | 08:16 PM | 3,073 | CommonCallAnalysisConfig.cpp |
| Feb. 26, 2006 | 08:16 PM | 504 | CommonCallAnalysisConfig.h |
| Oct. 29, 2008 | 06:48 PM | 17,341 | CommonDeviceAdapter.cpp |
| Oct. 29, 2008 | 07:52 PM | 5,757 | CommonDeviceAdapter.h |
| Nov. 11, 2008 | 01:32 AM | 4,033 | CommonLoggerConfig.cpp |
| Feb. 22, 2008 | 11:47 PM | 2,830 | CommonLoggerConfig.h |
| May 4, 2006 | 01:27 AM | 428 | ConfigMacros.h |
| Oct. 29, 2008 | 08:01 PM | 39,201 | DLI20_LogFileManager.cpp |
| Jul. 15, 2008 | 11:50 PM | 4,699 | DLI20_LogFileManager.h |
| Jun. 19, 2008 | 10:09 AM | 11,065 | DLI20_XMLLogFileManager.cpp |
| Jun. 18, 2008 | 03:27 PM | 766 | DLI20_XMLLogFileManager.h |
| Jun. 20, 2008 | 02:34 AM | 1,733 | DTMF.Txt |
| Sep. 12, 2008 | 10:27 AM | 1,980 | DeviceControlMacros.h |
| Jul. 28, 2008 | 02:33 PM | 12,596 | DeviceManager.cpp |
| Jul. 28, 2008 | 02:13 PM | 3,695 | DeviceManager.h |
| Sep. 13, 2008 | 11:31 AM | 7,391 | DeviceManagerControl.cpp |
| Oct. 29, 2008 | 07:38 PM | 11,526 | DeviceManagerInformation.cpp |
| Feb. 16, 2005 | 05:02 AM | 1,956 | ErrMsgApp.mc |
| Jan. 6, 2006 | 03:44 PM | 0 | Fifo.cpp |
| Jun. 25, 2006 | 05:34 PM | 740 | FileManagerConfig.h |
| Sep. 12, 2008 | 10:10 AM | 2,562 | IDeviceManagerControl.h |
| Oct. 29, 2008 | 07:58 PM | 7,211 | IDeviceManagerInformation.h |
| Jul. 26, 2005 | 10:23 AM | 627 | ILoggerControl.h |
| Feb. 27, 2007 | 11:30 PM | 1,109 | ILoggerInformation.h |
| Jun. 6, 2008 | 12:11 PM | 883 | IXMLSerializer.h |
| Nov. 7, 2008 | 02:14 PM | 7,432 | IniFile.cpp |
| Sep. 16, 2006 | 10:35 PM | 5,963 | IniFile.cpp.old |
| Sep. 11, 2008 | 04:53 PM | 1,719 | IniFile.h |
| Apr. 9, 2008 | 07:32 PM | 20,380 | LogFileManager.cpp |
| Apr. 10, 2008 | 05:59 PM | 2,370 | LogFileManager.h |
| Nov. 16, 2008 | 01:15 AM | 13,017 | Logger24.cpp |
| Nov. 1, 2008 | 10:35 AM | 3,119 | Logger24.h |
| Mar. 11, 2007 | 10:37 PM | 1,240 | LoggerControlMacros.h |
| Jan. 2, 2008 | 10:23 PM | 734 | LoggerInformationMacros.h |
| Mar. 11, 2007 | 05:45 PM | 614 | LoggerTasks.h |
| Feb. 16, 2005 | 05:02 AM | 331 | LoggerappExtLog.h |
| Nov. 21, 2008 | 03:07 PM | 2,177 | PGDatabaseGreateMacroces.h |
| Nov. 21, 2008 | 03:23 PM | 2,070 | PGDatabaseRecordMacroces.h |
| Nov. 21, 2008 | 03:08 PM | 1,523 | PGDatabaseTableMacroces.h |
| Nov. 21, 2008 | 12:51 PM | 287 | PGDatabaseUndefMacroces.h |
| Oct. 31, 2008 | 10:41 PM | 4 | PGSerializer.cpp |
| Nov. 19, 2008 | 03:40 PM | 6,552 | PGSerializer.h |
| Oct. 3, 2008 | 10:08 PM | 11,185 | Purge.cpp |

-continued

| | | | |
|---|---|---|---|
| Jul. 7, 2008 | 01:55 PM | 4,540 | Purge.h |
| Oct. 3, 2008 | 08:44 PM | 14,495 | PurgeChannel.cpp |
| Mar. 23, 2007 | 09:33 AM | 2,917 | PurgeChannel.h |
| Jul. 7, 2008 | 02:40 PM | 9,065 | PurgeDrive.cpp |
| May 19, 2007 | 12:31 PM | 2,962 | PurgeDrive.h |
| May 18, 2007 | 10:03 PM | 11,099 | PurgeTask.cpp |
| Mar. 19, 2007 | 03:31 AM | 2,084 | PurgeTask.h |
| Mar. 11, 2007 | 10:01 PM | 1,503 | ReflectionMacroses.h |
| Nov. 11, 2008 | 01:30 AM | 858 | SystemConfig.h |
| Mar. 11, 2007 | 10:52 AM | 3,939 | SystemTask.cpp |
| Mar. 22, 2005 | 03:27 PM | 603 | SystemTask.h |
| Jun. 21, 2008 | 01:08 AM | 2,277 | Task.cpp |
| Mar. 11, 2007 | 05:45 PM | 1,895 | Task.h |
| Nov. 21, 2006 | 06:40 PM | 4,127 | TemplateDialog.cpp |
| Mar. 25, 2005 | 06:33 PM | 1,046 | TemplateDialog.h |
| Mar. 27, 2005 | 01:47 AM | 1,424 | UserMessageDialog.cpp |
| Apr. 8, 2005 | 03:54 PM | 467 | UserMessageDialog.h |
| Apr. 18, 2006 | 07:51 PM | 2,714 | UserTask.cpp |
| Apr. 8, 2005 | 03:54 PM | 472 | UserTask.h |
| Apr. 28, 2008 | 10:52 AM | 33,546 | VuWindow.cpp |
| Jul. 13, 2006 | 02:16 AM | 3,315 | VuWindow.h |
| Apr. 28, 2008 | 10:53 AM | 16,606 | VuWindowTask.cpp |
| Jan. 9, 2006 | 01:53 PM | 572 | VuWindowTask.h |
| Nov. 7, 2008 | 12:59 PM | 30,138 | WorkerTask.cpp |
| Jul. 27, 2008 | 08:52 PM | 3,045 | WorkerTask.h |
| Jun. 6, 2008 | 11:11 AM | 614 | XMLSerializerMacros.h |
| Apr. 18, 2006 | 07:49 PM | 6,208 | XmlLogTask.cpp |
| Jan. 9, 2006 | 09:50 AM | 2,885 | XmlLogTask.h |
| Oct. 11, 2005 | 10:47 AM | 11,470 | common.cpp |
| Oct. 29, 2008 | 07:59 PM | 4,875 | deviceinformationmacros.h |
| Jan. 8, 2008 | 12:16 AM | 2,015,840 | dtmf.input.txt |
| Feb. 16, 2005 | 05:02 AM | 309 | log.xml |
| Mar. 27, 2008 | 06:42 PM | 145 | logger_app_version.h |
| Mar. 5, 2006 | 01:27 AM | 179 | loggerapp.bbs |
| Nov. 9, 2008 | 02:21 PM | 18,826 | loggerapp.dsp |
| Feb. 16, 2005 | 05:02 AM | 1,131 | loggerapp.dsw |
| Jan. 3, 2008 | 05:20 PM | 6,889 | main.cpp |
| Feb. 16, 2005 | 05:03 AM | 410 | resource.h |

List of files for directory
\Loggerapp_service_and_8T1_code\com_2\utilLib\proj

| Creation | Date | Size | File Name |
|---|---|---|---|
| Feb. 16, 2005 | 05:09 AM | 5,161 | utilLib.dsp |
| Feb. 16, 2005 | 05:09 AM | 537 | utilLib.dsw |
| Feb. 6, 2008 | 11:43 AM | 1,636 | utilLib.plg |
| Mar. 19, 2005 | 12:31 AM | 5,037 | utilLibDll.dsp |
| Jul. 19, 2007 | 02:10 AM | 251 | utilLibDll.plg |
| Feb. 16, 2005 | 05:09 AM | 5,035 | utilLibDll_MFC.dsp |
| Nov. 21, 2006 | 05:43 PM | 9,568 | utilLibDll_NET.vcproj |
| Nov. 26, 2008 | 02:46 AM | 1,407 | utilLibDll_NET.vcproj.ACER-KIDUYS8U77.brom.user |
| Nov. 23, 2006 | 11:01 PM | 1,387 | utilLibDll_NET.vcproj.HOME1.Brom.user |
| Nov. 24, 2006 | 11:28 PM | 9,581 | utilLibExe_NET.vcproj |
| Nov. 24, 2006 | 11:30 PM | 1,407 | utilLibExe_NET.vcproj.ACER-KIDUYS8U77.brom.user |
| Feb. 16, 2005 | 05:09 AM | 5,161 | utilLib_mfc.dsp |

List of files for directory
\Loggerapp_service_and_8T1_code\com_2\utilLib\proj\include

| Creation | Date | Size | File Name |
|---|---|---|---|
| Feb. 16, 2005 | 05:08 AM | 2,693 | Array.h |
| Feb. 6, 2008 | 10:26 PM | 7,781 | ConfigFile.h |
| Feb. 16, 2005 | 05:08 AM | 3,074 | CoreTypes.h |
| Feb. 16, 2005 | 05:08 AM | 2,683 | CoreUtil.h |
| Feb. 16, 2005 | 05:08 AM | 4,066 | ErrorCode.h |
| Mar. 22, 2005 | 11:17 AM | 2,506 | EventLog.h |
| Feb. 16, 2005 | 05:08 AM | 1,259 | FileUtil.h |
| Feb. 16, 2005 | 05:08 AM | 2,039 | PathSpec.h |
| Feb. 16, 2005 | 05:08 AM | 2,709 | Queue.h |
| Feb. 16, 2005 | 05:08 AM | 14,664 | SS_Error.h |
| Feb. 16, 2005 | 05:08 AM | 2,678 | SS_Platform.h |
| Feb. 16, 2005 | 05:08 AM | 3,012 | SysDefs.h |
| Aug. 31, 2006 | 08:21 PM | 3,098 | TextFile.h |
| Feb. 16, 2005 | 05:08 AM | 2,125 | Timer.h |

| | | | |
|---|---|---|---|
| Mar. 27, 2008 | 04:54 PM | 8,455 | Utility.h |
| Feb. 16, 2005 | 05:08 AM | 2,768 | Vector.h |

List of files for directory
\Loggerapp_service_and_8T1_code\com_2\utilLib\proj\source

| Creation | Date | Size | File Name |
|---|---|---|---|
| Feb. 6, 2008 | 10:39 PM | 51,332 | ConfigFile.cpp |
| Sep. 24, 2006 | 02:59 AM | 9,294 | eventlog.cpp |
| Apr. 13, 2007 | 04:44 PM | 8,640 | fileutil.cpp |
| Apr. 17, 2007 | 06:17 PM | 4,407 | pathspec.cpp |
| Nov. 13, 2007 | 12:06 PM | 14,711 | textfile.cpp |
| Feb. 16, 2005 | 05:09 AM | 6,135 | timer.cpp |
| Oct. 3, 2006 | 10:52 PM | 13,454 | utility.cpp |

List of files for directory
\Loggerapp_service_and_8T1_code\pgsql\include

| Creation | Date | Size | File Name |
|---|---|---|---|
| Sep. 9, 2008 | 05:18 AM | 94 | ecpg_config.h |
| Sep. 9, 2008 | 05:18 AM | 2,776 | ecpg_informix.h |
| Sep. 9, 2008 | 05:18 AM | 2,600 | ecpgerrno.h |
| Sep. 9, 2008 | 05:18 AM | 2,380 | ecpglib.h |
| Sep. 9, 2008 | 05:18 AM | 2,560 | ecpgtype.h |
| Sep. 9, 2008 | 05:18 AM | 18,410 | libpq-fe.h |
| Sep. 9, 2008 | 05:18 AM | 21,199 | pg_config.h |
| Sep. 9, 2008 | 05:18 AM | 8,954 | pg_config_manual.h |
| Sep. 9, 2008 | 05:18 AM | 9,785 | pg_config_os.h |
| Sep. 9, 2008 | 05:18 AM | 814 | pgtypes_date.h |
| Sep. 9, 2008 | 05:18 AM | 588 | pgtypes_error.h |
| Sep. 9, 2008 | 05:18 AM | 1,485 | pgtypes_interval.h |
| Sep. 9, 2008 | 05:18 AM | 2,306 | pgtypes_numeric.h |
| Sep. 9, 2008 | 05:18 AM | 1,057 | pgtypes_timestamp.h |
| Sep. 9, 2008 | 05:18 AM | 1,837 | postgres_ext.h |
| Sep. 9, 2008 | 05:18 AM | 834 | sql3type.h |
| Sep. 9, 2008 | 05:18 AM | 1,267 | sqlca.h |

List of files for directory
\Loggerapp_service_and_8T1_code\pgsql\include\informix\esql

| Creation | Date | Size | File Name |
|---|---|---|---|
| Sep. 9, 2008 | 05:18 AM | 385 | datetime.h |
| Sep. 9, 2008 | 05:18 AM | 349 | decimal.h |
| Sep. 9, 2008 | 05:18 AM | 1 | sqlda.h |
| Sep. 9, 2008 | 05:18 AM | 776 | sqltypes.h |

List of files for directory
\Loggerapp_service_and_8T1_code\pgsql\include\internal

| Creation | Date | Size | File Name |
|---|---|---|---|
| Sep. 9, 2008 | 05:18 AM | 23,839 | c.h |
| Sep. 9, 2008 | 05:18 AM | 20,143 | libpq-int.h |
| Sep. 9, 2008 | 05:18 AM | 12,656 | port.h |
| Sep. 9, 2008 | 05:18 AM | 790 | postgres_fe.h |
| Sep. 9, 2008 | 05:18 AM | 5,707 | pqexpbuffer.h |

List of files for directory
\Loggerapp_service_and_8T1_code\pgsql\include\server

| Creation | Date | Size | File Name |
|---|---|---|---|
| Sep. 9, 2008 | 05:18 AM | 23,839 | c.h |
| Sep. 9, 2008 | 05:18 AM | 22,804 | fmgr.h |
| Sep. 9, 2008 | 05:18 AM | 10,280 | funcapi.h |
| Sep. 9, 2008 | 05:18 AM | 3,996 | getaddrinfo.h |
| Sep. 9, 2008 | 05:18 AM | 981 | getopt_long.h |
| Sep. 9, 2008 | 05:18 AM | 11,512 | miscadmin.h |
| Sep. 9, 2008 | 05:18 AM | 21,199 | pg_config.h |
| Sep. 9, 2008 | 05:18 AM | 8,954 | pg_config_manual.h |
| Sep. 9, 2008 | 05:18 AM | 9,785 | pg_config_os.h |
| Sep. 9, 2008 | 05:18 AM | 1,568 | pg_trace.h |
| Sep. 9, 2008 | 05:18 AM | 16,355 | pgstat.h |
| Sep. 9, 2008 | 05:18 AM | 2,093 | pgtime.h |
| Sep. 9, 2008 | 05:18 AM | 12,656 | port.h |
| Sep. 9, 2008 | 05:18 AM | 21,898 | postgres.h |

-continued

| | | | |
|---|---|---|---|
| Sep. 9, 2008 | 05:18 AM | 1,837 | postgres_ext.h |
| Sep. 9, 2008 | 05:18 AM | 790 | postgres_fe.h |
| Sep. 9, 2008 | 05:18 AM | 903 | rusagestub.h |

List of files for directory
\Loggerapp_service_and_8T1_code\pgsql\include\server\access

| Creation | Date | Size | File Name |
|---|---|---|---|
| Sep. 9, 2008 | 05:18 AM | 1,613 | attnum.h |
| Sep. 9, 2008 | 05:18 AM | 1,529 | clog.h |
| Sep. 9, 2008 | 05:18 AM | 5,229 | genam.h |
| Sep. 9, 2008 | 05:18 AM | 13,535 | gin.h |
| Sep. 9, 2008 | 05:18 AM | 5,110 | gist.h |
| Sep. 9, 2008 | 05:18 AM | 10,230 | gist_private.h |
| Sep. 9, 2008 | 05:18 AM | 788 | gistscan.h |
| Sep. 9, 2008 | 05:18 AM | 12,076 | hash.h |
| Sep. 9, 2008 | 05:18 AM | 10,128 | heapam.h |
| Sep. 9, 2008 | 05:18 AM | 800 | hio.h |
| Sep. 9, 2008 | 05:18 AM | 26,037 | htup.h |
| Sep. 9, 2008 | 05:18 AM | 4,401 | itup.h |
| Sep. 9, 2008 | 05:18 AM | 2,448 | multixact.h |
| Sep. 9, 2008 | 05:18 AM | 23,757 | nbtree.h |
| Sep. 9, 2008 | 05:18 AM | 1,046 | printtup.h |
| Sep. 9, 2008 | 05:18 AM | 1,343 | reloptions.h |
| Sep. 9, 2008 | 05:18 AM | 3,921 | relscan.h |
| Sep. 9, 2008 | 05:18 AM | 1,070 | rewriteheap.h |
| Sep. 9, 2008 | 05:18 AM | 779 | rmgr.h |
| Sep. 9, 2008 | 05:18 AM | 1,526 | sdir.h |
| Sep. 9, 2008 | 05:18 AM | 5,705 | skey.h |
| Sep. 9, 2008 | 05:18 AM | 4,142 | slru.h |
| Sep. 9, 2008 | 05:18 AM | 1,015 | subtrans.h |
| Sep. 9, 2008 | 05:18 AM | 5,872 | transam.h |
| Sep. 9, 2008 | 05:18 AM | 4,087 | tupdesc.h |
| Sep. 9, 2008 | 05:18 AM | 7,381 | tupmacs.h |
| Sep. 9, 2008 | 05:18 AM | 5,378 | tuptoaster.h |
| Sep. 9, 2008 | 05:18 AM | 1,603 | twophase.h |
| Sep. 9, 2008 | 05:18 AM | 1,282 | twophase_rmgr.h |
| Sep. 9, 2008 | 05:18 AM | 1,453 | valid.h |
| Sep. 9, 2008 | 05:18 AM | 6,189 | xact.h |
| Sep. 9, 2008 | 05:18 AM | 8,210 | xlog.h |
| Sep. 9, 2008 | 05:18 AM | 8,400 | xlog_internal.h |
| Sep. 9, 2008 | 05:18 AM | 4,766 | xlogdefs.h |
| Sep. 9, 2008 | 05:18 AM | 843 | xlogutils.h |

List of files for directory
\Loggerapp_service_and_8T1_code\pgsql\include\server\bootstrap

| Creation | Date | Size | File Name |
|---|---|---|---|
| Sep. 9, 2008 | 05:18 AM | 1,966 | bootstrap.h |

List of files for directory
\Loggerapp_service_and_8T1_code\pgsql\include\server\catalog

| Creation | Date | Size | File Name |
|---|---|---|---|
| Sep. 9, 2008 | 05:18 AM | 1,258 | catalog.h |
| Sep. 9, 2008 | 05:18 AM | 2,647 | catversion.h |
| Sep. 9, 2008 | 05:18 AM | 8,700 | dependency.h |
| Sep. 9, 2008 | 05:18 AM | 3,060 | heap.h |
| Sep. 9, 2008 | 05:18 AM | 1,982 | index.h |
| Sep. 9, 2008 | 05:18 AM | 13,618 | indexing.h |
| Sep. 9, 2008 | 05:18 AM | 4,352 | namespace.h |
| Sep. 9, 2008 | 05:18 AM | 10,543 | pg_aggregate.h |
| Sep. 9, 2008 | 05:18 AM | 5,150 | pg_am.h |
| Sep. 9, 2008 | 05:18 AM | 21,787 | pg_amop.h |
| Sep. 9, 2008 | 05:18 AM | 12,852 | pg_amproc.h |
| Sep. 9, 2008 | 05:18 AM | 1,681 | pg_attrdef.h |
| Sep. 9, 2008 | 05:18 AM | 26,552 | pg_attribute.h |
| Sep. 9, 2008 | 05:18 AM | 1,742 | pg_auth_members.h |
| Sep. 9, 2008 | 05:18 AM | 3,221 | pg_authid.h |
| Sep. 9, 2008 | 05:18 AM | 2,396 | pg_autovacuum.h |
| Sep. 9, 2008 | 05:18 AM | 10,551 | pg_cast.h |
| Sep. 9, 2008 | 05:18 AM | 5,783 | pg_class.h |
| Sep. 9, 2008 | 05:18 AM | 6,616 | pg_constraint.h |
| Sep. 9, 2008 | 05:18 AM | 5,522 | pg_control.h |
| Sep. 9, 2008 | 05:18 AM | 2,959 | pg_conversion.h |
| Sep. 9, 2008 | 05:18 AM | 2,710 | pg_database.h |

-continued

| | | | |
|---|---|---|---|
| Sep. 9, 2008 | 05:18 AM | 3,050 | pg_depend.h |
| Sep. 9, 2008 | 05:18 AM | 3,168 | pg_description.h |
| Sep. 9, 2008 | 05:18 AM | 1,904 | pg_enum.h |
| Sep. 9, 2008 | 05:18 AM | 3,264 | pg_index.h |
| Sep. 9, 2008 | 05:18 AM | 1,669 | pg_inherits.h |
| Sep. 9, 2008 | 05:18 AM | 2,511 | pg_language.h |
| Sep. 9, 2008 | 05:18 AM | 1,948 | pg_largeobject.h |
| Sep. 9, 2008 | 05:18 AM | 1,788 | pg_listener.h |
| Sep. 9, 2008 | 05:18 AM | 2,481 | pg_namespace.h |
| Sep. 9, 2008 | 05:18 AM | 10,861 | pg_opclass.h |
| Sep. 9, 2008 | 05:18 AM | 76,853 | pg_operator.h |
| Sep. 9, 2008 | 05:18 AM | 6,361 | pg_opfamily.h |
| Sep. 9, 2008 | 05:18 AM | 2,856 | pg_pltemplate.h |
| Sep. 9, 2008 | 05:18 AM | 349,205 | pg_proc.h |
| Sep. 9, 2008 | 05:18 AM | 2,125 | pg_rewrite.h |
| Sep. 9, 2008 | 05:18 AM | 2,926 | pg_shdepend.h |
| Sep. 9, 2008 | 05:18 AM | 2,626 | pg_shdescription.h |
| Sep. 9, 2008 | 05:18 AM | 9,438 | pg_statistic.h |
| Sep. 9, 2008 | 05:18 AM | 2,086 | pg_tablespace.h |
| Sep. 9, 2008 | 05:18 AM | 4,191 | pg_trigger.h |
| Sep. 9, 2008 | 05:18 AM | 1,899 | pg_ts_config.h |
| Sep. 9, 2008 | 05:18 AM | 2,588 | pg_ts_config_map.h |
| Sep. 9, 2008 | 05:18 AM | 2,004 | pg_ts_dict.h |
| Sep. 9, 2008 | 05:18 AM | 2,247 | pg_ts_parser.h |
| Sep. 9, 2008 | 05:18 AM | 2,406 | pg_ts_template.h |
| Sep. 9, 2008 | 05:18 AM | 36,401 | pg_type.h |
| Sep. 9, 2008 | 05:18 AM | 2,001 | toasting.h |

List of files for directory
\Loggerapp_service_and_8T1_code\pgsql\include\server\commands

| Creation | Date | Size | File Name |
|---|---|---|---|
| Sep. 9, 2008 | 05:18 AM | 712 | alter.h |
| Sep. 9, 2008 | 05:18 AM | 1,565 | async.h |
| Sep. 9, 2008 | 05:18 AM | 968 | cluster.h |
| Sep. 9, 2008 | 05:18 AM | 1,262 | comment.h |
| Sep. 9, 2008 | 05:18 AM | 964 | conversioncmds.h |
| Sep. 9, 2008 | 05:18 AM | 701 | copy.h |
| Sep. 9, 2008 | 05:18 AM | 2,046 | dbcommands.h |
| Sep. 9, 2008 | 05:18 AM | 5,715 | defrem.h |
| Sep. 9, 2008 | 05:18 AM | 530 | discard.h |
| Sep. 9, 2008 | 05:18 AM | 1,559 | explain.h |
| Sep. 9, 2008 | 05:18 AM | 618 | lockcmds.h |
| Sep. 9, 2008 | 05:18 AM | 985 | portalcmds.h |
| Sep. 9, 2008 | 05:18 AM | 2,306 | prepare.h |
| Sep. 9, 2008 | 05:18 AM | 732 | proclang.h |
| Sep. 9, 2008 | 05:18 AM | 982 | schemacmds.h |
| Sep. 9, 2008 | 05:18 AM | 2,695 | sequence.h |
| Sep. 9, 2008 | 05:18 AM | 2,175 | tablecmds.h |
| Sep. 9, 2008 | 05:18 AM | 1,604 | tablespace.h |
| Sep. 9, 2008 | 05:18 AM | 5,530 | trigger.h |
| Sep. 9, 2008 | 05:18 AM | 1,701 | typecmds.h |
| Sep. 9, 2008 | 05:18 AM | 819 | user.h |
| Sep. 9, 2008 | 05:18 AM | 5,238 | vacuum.h |
| Sep. 9, 2008 | 05:18 AM | 1,404 | variable.h |
| Sep. 9, 2008 | 05:18 AM | 516 | version.h |
| Sep. 9, 2008 | 05:18 AM | 639 | view.h |

List of files for directory
\Loggerapp_service_and_8T1_code\pgsql\include\server\executor

| Creation | Date | Size | File Name |
|---|---|---|---|
| Sep. 9, 2008 | 05:18 AM | 6,270 | execdebug.h |
| Sep. 9, 2008 | 05:18 AM | 924 | execdefs.h |
| Sep. 9, 2008 | 05:18 AM | 2,201 | execdesc.h |
| Sep. 9, 2008 | 05:18 AM | 11,451 | executor.h |
| Sep. 9, 2008 | 05:18 AM | 742 | functions.h |
| Sep. 9, 2008 | 05:18 AM | 5,319 | hashjoin.h |
| Sep. 9, 2008 | 05:18 AM | 2,532 | instrument.h |
| Sep. 9, 2008 | 05:18 AM | 906 | nodeAgg.h |
| Sep. 9, 2008 | 05:18 AM | 831 | nodeAppend.h |
| Sep. 9, 2008 | 05:18 AM | 873 | nodeBitmapAnd.h |
| Sep. 9, 2008 | 05:18 AM | 954 | nodeBitmapHeapscan.h |
| Sep. 9, 2008 | 05:18 AM | 965 | nodeBitmapIndexscan.h |
| Sep. 9, 2008 | 05:18 AM | 857 | nodeBitmapOr.h |
| Sep. 9, 2008 | 05:18 AM | 1,040 | nodeFunctionscan.h |
| Sep. 9, 2008 | 05:18 AM | 844 | nodeGroup.h |

-continued

| Sep. 9, 2008 | 05:18 AM | 1,697 | nodeHash.h |
|---|---|---|---|
| Sep. 9, 2008 | 05:18 AM | 1,024 | nodeHashjoin.h |
| Sep. 9, 2008 | 05:18 AM | 1,667 | nodeIndexscan.h |
| Sep. 9, 2008 | 05:18 AM | 815 | nodeLimit.h |
| Sep. 9, 2008 | 05:18 AM | 972 | nodeMaterial.h |
| Sep. 9, 2008 | 05:18 AM | 879 | nodeMergejoin.h |
| Sep. 9, 2008 | 05:18 AM | 863 | nodeNestloop.h |
| Sep. 9, 2008 | 05:18 AM | 932 | nodeResult.h |
| Sep. 9, 2008 | 05:18 AM | 940 | nodeSeqscan.h |
| Sep. 9, 2008 | 05:18 AM | 815 | nodeSetOp.h |
| Sep. 9, 2008 | 05:18 AM | 892 | nodeSort.h |
| Sep. 9, 2008 | 05:18 AM | 878 | nodeSubplan.h |
| Sep. 9, 2008 | 05:18 AM | 923 | nodeSubqueryscan.h |
| Sep. 9, 2008 | 05:18 AM | 940 | nodeTidscan.h |
| Sep. 9, 2008 | 05:18 AM | 831 | nodeUnique.h |
| Sep. 9, 2008 | 05:18 AM | 999 | nodeValuesscan.h |
| Sep. 9, 2008 | 05:18 AM | 5,383 | spi.h |
| Sep. 9, 2008 | 05:18 AM | 2,967 | spi_priv.h |
| Sep. 9, 2008 | 05:18 AM | 725 | tstoreReceiver.h |
| Sep. 9, 2008 | 05:18 AM | 8,357 | tuptable.h |

List of files for directory
\Loggerapp_service_and_8T1_code\pgsql\include\server\lib

| Creation | Date | Size | File Name |
|---|---|---|---|
| Sep. 9, 2008 | 05:18 AM | 2,931 | dllist.h |
| Sep. 9, 2008 | 05:18 AM | 5,321 | stringinfo.h |

List of files for directory
\Loggerapp_service_and_8T1_code\pgsql\include\server\libpq

| Creation | Date | Size | File Name |
|---|---|---|---|
| Sep. 9, 2008 | 05:18 AM | 759 | auth.h |
| Sep. 9, 2008 | 05:18 AM | 1,534 | be-fsstubs.h |
| Sep. 9, 2008 | 05:18 AM | 610 | crypt.h |
| Sep. 9, 2008 | 05:18 AM | 937 | hba.h |
| Sep. 9, 2008 | 05:18 AM | 1,511 | ip.h |
| Sep. 9, 2008 | 05:18 AM | 5,206 | libpq-be.h |
| Sep. 9, 2008 | 05:18 AM | 693 | libpq-fs.h |
| Sep. 9, 2008 | 05:18 AM | 2,134 | libpq.h |
| Sep. 9, 2008 | 05:18 AM | 889 | md5.h |
| Sep. 9, 2008 | 05:18 AM | 5,836 | pqcomm.h |
| Sep. 9, 2008 | 05:18 AM | 1,990 | pqformat.h |
| Sep. 9, 2008 | 05:18 AM | 1,168 | pgsignal.h |

List of files for directory
\Loggerapp_service_and_8T1_code\pgsql\include\server\mb

| Creation | Date | Size | File Name |
|---|---|---|---|
| Sep. 9, 2008 | 05:18 AM | 14,755 | pg_wchar.h |

List of files for directory
\Loggerapp_service_and_8T1_code\pgsql\include\server\nodes

| Creation | Date | Size | File Name |
|---|---|---|---|
| Sep. 9, 2008 | 05:18 AM | 3,133 | bitmapset.h |
| Sep. 9, 2008 | 05:18 AM | 49,943 | execnodes.h |
| Sep. 9, 2008 | 05:18 AM | 2,021 | makefuncs.h |
| Sep. 9, 2008 | 05:18 AM | 2,605 | memnodes.h |
| Sep. 9, 2008 | 05:18 AM | 633 | nodeFuncs.h |
| Sep. 9, 2008 | 05:18 AM | 10,716 | nodes.h |
| Sep. 9, 2008 | 05:18 AM | 2,865 | params.h |
| Sep. 9, 2008 | 05:18 AM | 64,676 | parsenodes.h |
| Sep. 9, 2008 | 05:18 AM | 11,246 | pg_list.h |
| Sep. 9, 2008 | 05:18 AM | 17,320 | plannodes.h |
| Sep. 9, 2008 | 05:18 AM | 41,639 | primnodes.h |
| Sep. 9, 2008 | 05:18 AM | 1,098 | print.h |
| Sep. 9, 2008 | 05:18 AM | 957 | readfuncs.h |
| Sep. 9, 2008 | 05:18 AM | 53,926 | relation.h |
| Sep. 9, 2008 | 05:18 AM | 1,956 | tidbitmap.h |
| Sep. 9, 2008 | 05:18 AM | 1,857 | value.h |

List of files for directory
\Loggerapp_service_and_8T1_code\pgsql\include\server\optimizer

| Creation | Date | Size | File Name |
| --- | --- | --- | --- |
| Sep. 9, 2008 | 05:18 AM | 3,824 | clauses.h |
| Sep. 9, 2008 | 05:18 AM | 4,650 | cost.h |
| Sep. 9, 2008 | 05:18 AM | 2,217 | geqo.h |
| Sep. 9, 2008 | 05:18 AM | 1,011 | geqo_copy.h |
| Sep. 9, 2008 | 05:18 AM | 1,174 | geqo_gene.h |
| Sep. 9, 2008 | 05:18 AM | 1,212 | geqo_misc.h |
| Sep. 9, 2008 | 05:18 AM | 1,004 | geqo_mutation.h |
| Sep. 9, 2008 | 05:18 AM | 1,268 | geqo_pool.h |
| Sep. 9, 2008 | 05:18 AM | 1,297 | geqo_random.h |
| Sep. 9, 2008 | 05:18 AM | 2,460 | geqo_recombination.h |
| Sep. 9, 2008 | 05:18 AM | 1,048 | geqo_selection.h |
| Sep. 9, 2008 | 05:18 AM | 771 | joininfo.h |
| Sep. 9, 2008 | 05:18 AM | 3,327 | pathnode.h |
| Sep. 9, 2008 | 05:18 AM | 6,846 | paths.h |
| Sep. 9, 2008 | 05:18 AM | 1,545 | plancat.h |
| Sep. 9, 2008 | 05:18 AM | 3,769 | planmain.h |
| Sep. 9, 2008 | 05:18 AM | 1,144 | planner.h |
| Sep. 9, 2008 | 05:18 AM | 727 | predtest.h |
| Sep. 9, 2008 | 05:18 AM | 1,643 | prep.h |
| Sep. 9, 2008 | 05:18 AM | 1,341 | restrictinfo.h |
| Sep. 9, 2008 | 05:18 AM | 952 | subselect.h |
| Sep. 9, 2008 | 05:18 AM | 1,199 | tlist.h |
| Sep. 9, 2008 | 05:18 AM | 1,084 | var.h |

List of files for directory
\Loggerapp_service_and_8T1_code\pgsql\include\server\parser

| Creation | Date | Size | File Name |
| --- | --- | --- | --- |
| Sep. 9, 2008 | 05:18 AM | 1,077 | analyze.h |
| Sep. 9, 2008 | 05:18 AM | 1,731 | gramparse.h |
| Sep. 9, 2008 | 05:18 AM | 956 | keywords.h |
| Sep. 9, 2008 | 05:18 AM | 929 | parse_agg.h |
| Sep. 9, 2008 | 05:18 AM | 1,897 | parse_clause.h |
| Sep. 9, 2008 | 05:18 AM | 3,129 | parse_coerce.h |
| Sep. 9, 2008 | 05:18 AM | 791 | parse_expr.h |
| Sep. 9, 2008 | 05:18 AM | 2,543 | parse_func.h |
| Sep. 9, 2008 | 05:18 AM | 4,341 | parse_node.h |
| Sep. 9, 2008 | 05:18 AM | 2,716 | parse_oper.h |
| Sep. 9, 2008 | 05:18 AM | 3,072 | parse_relation.h |
| Sep. 9, 2008 | 05:18 AM | 1,440 | parse_target.h |
| Sep. 9, 2008 | 05:18 AM | 1,468 | parse_type.h |
| Sep. 9, 2008 | 05:18 AM | 1,012 | parse_utilcmd.h |
| Sep. 9, 2008 | 05:18 AM | 585 | parser.h |
| Sep. 9, 2008 | 05:18 AM | 2,107 | parsetree.h |
| Sep. 9, 2008 | 05:18 AM | 812 | scansup.h |

List of files for directory
\Loggerapp_service_and_8T1_code\pgsql\include\server\port

| Creation | Date | Size | File Name |
| --- | --- | --- | --- |
| Sep. 9, 2008 | 05:18 AM | 49 | aix.h |
| Sep. 9, 2008 | 05:18 AM | 1 | bsdi.h |
| Sep. 9, 2008 | 05:18 AM | 471 | cygwin.h |
| Sep. 9, 2008 | 05:18 AM | 217 | darwin.h |
| Sep. 9, 2008 | 05:18 AM | 108 | dgux.h |
| Sep. 9, 2008 | 05:18 AM | 93 | freebsd.h |
| Sep. 9, 2008 | 05:18 AM | 108 | hpux.h |
| Sep. 9, 2008 | 05:18 AM | 246 | irix.h |
| Sep. 9, 2008 | 05:18 AM | 766 | linux.h |
| Sep. 9, 2008 | 05:18 AM | 92 | netbsd.h |
| Sep. 9, 2008 | 05:18 AM | 430 | nextstep.h |
| Sep. 9, 2008 | 05:18 AM | 93 | openbsd.h |
| Sep. 9, 2008 | 05:18 AM | 132 | osf.h |
| Sep. 9, 2008 | 05:18 AM | 83 | sco.h |
| Sep. 9, 2008 | 05:18 AM | 1,101 | solaris.h |
| Sep. 9, 2008 | 05:18 AM | 77 | sunos4.h |
| Sep. 9, 2008 | 05:18 AM | 40 | svr4.h |
| Sep. 9, 2008 | 05:18 AM | 1,776 | ultrix4.h |
| Sep. 9, 2008 | 05:18 AM | 181 | univel.h |
| Sep. 9, 2008 | 05:18 AM | 242 | unixware.h |
| Sep. 9, 2008 | 05:18 AM | 9,454 | win32.h |

-continued

| List of files for directory \Loggerapp_service_and_8T1_code\pgsql\include\server\port\win32 | | | |
|---|---|---|---|
| Creation | Date | Size | File Name |
| Sep. 9, 2008 | 05:18 AM | 96 | dlfcn.h |
| Sep. 9, 2008 | 05:18 AM | 94 | grp.h |
| Sep. 9, 2008 | 05:18 AM | 96 | netdb.h |
| Sep. 9, 2008 | 05:18 AM | 1 | pwd.h |

| List of files for directory \Loggerapp_service_and_8T1_code\pgsql\include\server\port\win32\arpa | | | |
|---|---|---|---|
| Creation | Date | Size | File Name |
| Sep. 9, 2008 | 05:18 AM | 125 | inet.h |

| List of files for directory \Loggerapp_service_and_8T1_code\pgsql\include\server\port\win32\netinet | | | |
|---|---|---|---|
| Creation | Date | Size | File Name |
| Sep. 9, 2008 | 05:18 AM | 126 | in.h |

| List of files for directory \Loggerapp_service_and_8T1_code\pgsql\include\server\port\win32\sys | | | |
|---|---|---|---|
| Creation | Date | Size | File Name |
| Sep. 9, 2008 | 05:18 AM | 734 | socket.h |
| Sep. 9, 2008 | 05:18 AM | 1 | wait.h |

| List of files for directory \Loggerapp_service_and_8T1_code\pgsql\include\server\port\win32_msvc | | | |
|---|---|---|---|
| Creation | Date | Size | File Name |
| Sep. 9, 2008 | 05:18 AM | 470 | dirent.h |
| Sep. 9, 2008 | 05:18 AM | 102 | unistd.h |
| Sep. 9, 2008 | 05:18 AM | 101 | utime.h |

| List of files for directory \Loggerapp_service_and_8T1_code\pgsql\include\server\port\win32_msvc\sys | | | |
|---|---|---|---|
| Creation | Date | Size | File Name |
| Sep. 9, 2008 | 05:18 AM | 104 | file.h |
| Sep. 9, 2008 | 05:18 AM | 105 | param.h |
| Sep. 9, 2008 | 05:18 AM | 104 | time.h |

| List of files for directory \Loggerapp_service_and_8T1_code\pgsql\include\server\postmaster | | | |
|---|---|---|---|
| Creation | Date | Size | File Name |
| Sep. 9, 2008 | 05:18 AM | 1,951 | autovacuum.h |
| Sep. 9, 2008 | 05:18 AM | 1,002 | bgwriter.h |
| Sep. 9, 2008 | 05:18 AM | 506 | fork_process.h |
| Sep. 9, 2008 | 05:18 AM | 700 | pgarch.h |
| Sep. 9, 2008 | 05:18 AM | 1,385 | postmaster.h |
| Sep. 9, 2008 | 05:18 AM | 2,605 | syslogger.h |
| Sep. 9, 2008 | 05:18 AM | 546 | walwriter.h |

| List of files for directory \Loggerapp_service_and_8T1_code\pgsql\include\server\regex | | | |
|---|---|---|---|
| Creation | Date | Size | File Name |
| Sep. 9, 2008 | 05:18 AM | 2,760 | regcustom.h |
| Sep. 9, 2008 | 05:18 AM | 1,269 | regerrs.h |
| Sep. 9, 2008 | 05:18 AM | 6,308 | regex.h |
| Sep. 9, 2008 | 05:18 AM | 12,469 | regguts.h |

-continued

List of files for directory
\Loggerapp_service_and_8T1_code\pgsql\include\server\rewrite

| Creation | Date | Size | File Name |
|---|---|---|---|
| Sep. 9, 2008 | 05:18 AM | 1,130 | prs2lock.h |
| Sep. 9, 2008 | 05:18 AM | 1,175 | rewriteDefine.h |
| Sep. 9, 2008 | 05:18 AM | 773 | rewriteHandler.h |
| Sep. 9, 2008 | 05:18 AM | 1,475 | rewriteManip.h |
| Sep. 9, 2008 | 05:18 AM | 712 | rewriteRemove.h |
| Sep. 9, 2008 | 05:18 AM | 790 | rewriteSupport.h |

List of files for directory
\Loggerapp_service_and_8T1_code\pgsql\include\server\snowball

| Creation | Date | Size | File Name |
|---|---|---|---|
| Sep. 9, 2008 | 05:18 AM | 1,724 | header.h |

List of files for directory
\Loggerapp_service_and_8T1_code\pgsql\include\server\snowball\libstemmer

| Creation | Date | Size | File Name |
|---|---|---|---|
| Sep. 9, 2008 | 05:18 AM | 763 | api.h |
| Sep. 9, 2008 | 05:18 AM | 2,487 | header.h |
| Sep. 9, 2008 | 05:18 AM | 325 | stem_ISO_8859_1_danish.h |
| Sep. 9, 2008 | 05:18 AM | 322 | stem_ISO_8859_1_dutch.h |
| Sep. 9, 2008 | 05:18 AM | 328 | stem_ISO_8859_1_english.h |
| Sep. 9, 2008 | 05:18 AM | 328 | stem_ISO_8859_1_finnish.h |
| Sep. 9, 2008 | 05:18 AM | 325 | stem_ISO_8859_1_trench.h |
| Sep. 9, 2008 | 05:18 AM | 325 | stem_ISO_8859_1_german.h |
| Sep. 9, 2008 | 05:18 AM | 334 | stem_ISO_8859_1_hungarian.h |
| Sep. 9, 2008 | 05:18 AM | 328 | stem_ISO_8859_1_italian.h |
| Sep. 9, 2008 | 05:18 AM | 334 | stem_ISO_8859_1_norwegian.h |
| Sep. 9, 2008 | 05:18 AM | 325 | stem_ISO_8859_1_porter.h |
| Sep. 9, 2008 | 05:18 AM | 337 | stem_ISO_8859_1_portuguese.h |
| Sep. 9, 2008 | 05:18 AM | 328 | stem_ISO_8859_1_spanish.h |
| Sep. 9, 2008 | 05:18 AM | 328 | stem_ISO_8859_1_swedish.h |
| Sep. 9, 2008 | 05:18 AM | 331 | stem_ISO_8859_2_romanian.h |
| Sep. 9, 2008 | 05:18 AM | 316 | stem_KOI8_R_russian.h |
| Sep. 9, 2008 | 05:18 AM | 310 | stem_UTF_8_danish.h |
| Sep. 9, 2008 | 05:18 AM | 307 | stem_UTF_8_dutch.h |
| Sep. 9, 2008 | 05:18 AM | 313 | stem_UTF_8_english.h |
| Sep. 9, 2008 | 05:18 AM | 313 | stem_UTF_8_finnish.h |
| Sep. 9, 2008 | 05:18 AM | 310 | stem_UTF_8_french.h |
| Sep. 9, 2008 | 05:18 AM | 310 | stem_UTF_8_german.h |
| Sep. 9, 2008 | 05:18 AM | 319 | stem_UTF_8_hungarian.h |
| Sep. 9, 2008 | 05:18 AM | 313 | stem_UTF_8_italian.h |
| Sep. 9, 2008 | 05:18 AM | 319 | stem_UTF_8_norwegian.h |
| Sep. 9, 2008 | 05:18 AM | 310 | stem_UTF_8_porter.h |
| Sep. 9, 2008 | 05:18 AM | 322 | stem_UTF_8_portuguese.h |
| Sep. 9, 2008 | 05:18 AM | 316 | stem_UTF_8_romanian.h |
| Sep. 9, 2008 | 05:18 AM | 313 | stem_UTF_8_russian.h |
| Sep. 9, 2008 | 05:18 AM | 313 | stem_UTF_8_spanish.h |
| Sep. 9, 2008 | 05:18 AM | 313 | stem_UTF_8_swedish.h |
| Sep. 9, 2008 | 05:18 AM | 313 | stem_UTF_8_turkish.h |

List of files for directory
\Loggerapp_service_and_8T1_code\pgsql\include\server\storage

| Creation | Date | Size | File Name |
|---|---|---|---|
| Sep. 9, 2008 | 05:18 AM | 777 | backendid.h |
| Sep. 9, 2008 | 05:18 AM | 3,341 | block.h |
| Sep. 9, 2008 | 05:18 AM | 1,142 | buf.h |
| Sep. 9, 2008 | 05:18 AM | 7,736 | buf_internals.h |
| Sep. 9, 2008 | 05:18 AM | 1,772 | buffile.h |
| Sep. 9, 2008 | 05:18 AM | 5,199 | bufmgr.h |
| Sep. 9, 2008 | 05:18 AM | 13,097 | bufpage.h |
| Sep. 9, 2008 | 05:18 AM | 3,166 | fd.h |
| Sep. 9, 2008 | 05:18 AM | 6,009 | freespace.h |
| Sep. 9, 2008 | 05:18 AM | 2,550 | ipc.h |
| Sep. 9, 2008 | 05:18 AM | 529 | item.h |
| Sep. 9, 2008 | 05:18 AM | 4,401 | itemid.h |
| Sep. 9, 2008 | 05:18 AM | 1,094 | itempos.h |
| Sep. 9, 2008 | 05:18 AM | 3,872 | itemptr.h |
| Sep. 9, 2008 | 05:18 AM | 3,021 | large_object.h |
| Sep. 9, 2008 | 05:18 AM | 3,305 | lmgr.h |

-continued

| | | | |
|---|---|---|---|
| Sep. 9, 2008 | 05:18 AM | 19,472 | lock.h |
| Sep. 9, 2008 | 05:18 AM | 2,837 | lwlock.h |
| Sep. 9, 2008 | 05:18 AM | 1,678 | off.h |
| Sep. 9, 2008 | 05:18 AM | 2,529 | pg_sema.h |
| Sep. 9, 2008 | 05:18 AM | 1,959 | pg_shmem.h |
| Sep. 9, 2008 | 05:18 AM | 1,598 | pmsignal.h |
| Sep. 9, 2008 | 05:18 AM | 1,652 | pos.h |
| Sep. 9, 2008 | 05:18 AM | 6,352 | proc.h |
| Sep. 9, 2008 | 05:18 AM | 1,745 | procarray.h |
| Sep. 9, 2008 | 05:18 AM | 2,233 | relfilenode.h |
| Sep. 9, 2008 | 05:18 AM | 21,954 | s_lock.h |
| Sep. 9, 2008 | 05:18 AM | 3,138 | shmem.h |
| Sep. 9, 2008 | 05:18 AM | 4,053 | sinval.h |
| Sep. 9, 2008 | 05:18 AM | 4,549 | sinvaladt.h |
| Sep. 9, 2008 | 05:18 AM | 4,573 | smgr.h |
| Sep. 9, 2008 | 05:18 AM | 2,628 | spin.h |

List of files for directory
\Loggerapp_service_and_8T1_code\pgsql\include\server\tcop

| Creation | Date | Size | File Name |
|---|---|---|---|
| Sep. 9, 2008 | 05:18 AM | 5,448 | dest.h |
| Sep. 9, 2008 | 05:18 AM | 569 | fastpath.h |
| Sep. 9, 2008 | 05:18 AM | 1,202 | pquery.h |
| Sep. 9, 2008 | 05:18 AM | 1,376 | tcopdebug.h |
| Sep. 9, 2008 | 05:18 AM | 2,745 | tcopprot.h |
| Sep. 9, 2008 | 05:18 AM | 1,046 | utility.h |

List of files for directory
\Loggerapp_service_and_8T1_code\pgsql\include\server\tsearch

| Creation | Date | Size | File Name |
|---|---|---|---|
| Sep. 9, 2008 | 05:18 AM | 2,126 | ts_cache.h |
| Sep. 9, 2008 | 05:18 AM | 1,891 | ts_locale.h |
| Sep. 9, 2008 | 05:18 AM | 2,424 | ts_public.h |
| Sep. 9, 2008 | 05:18 AM | 8,441 | ts_type.h |
| Sep. 9, 2008 | 05:18 AM | 7,345 | ts_utils.h |

List of files for directory
\Loggerapp_service_and_8T1_code\pgsql\include\server\tsearch\dicts

| Creation | Date | Size | File Name |
|---|---|---|---|
| Sep. 9, 2008 | 05:18 AM | 974 | regis.h |
| Sep. 9, 2008 | 05:18 AM | 3,346 | spell.h |

List of files for directory
\Loggerapp_service_and_8T1_code\pgsql\include\server\utils

| Creation | Date | Size | File Name |
|---|---|---|---|
| Sep. 9, 2008 | 05:18 AM | 10,702 | acl.h |
| Sep. 9, 2008 | 05:18 AM | 9,915 | array.h |
| Sep. 9, 2008 | 05:18 AM | 561 | ascii.h |
| Sep. 9, 2008 | 05:18 AM | 40,033 | builtins.h |
| Sep. 9, 2008 | 05:18 AM | 1,604 | cash.h |
| Sep. 9, 2008 | 05:18 AM | 7,678 | catcache.h |
| Sep. 9, 2008 | 05:18 AM | 757 | combocid.h |
| Sep. 9, 2008 | 05:18 AM | 7,309 | date.h |
| Sep. 9, 2008 | 05:18 AM | 8,940 | datetime.h |
| Sep. 9, 2008 | 05:18 AM | 1,580 | datum.h |
| Sep. 9, 2008 | 05:18 AM | 558 | dynahash.h |
| Sep. 9, 2008 | 05:18 AM | 708 | dynamic_loader.h |
| Sep. 9, 2008 | 05:18 AM | 10,406 | elog.h |
| Sep. 9, 2008 | 05:18 AM | 20,650 | errcodes.h |
| Sep. 9, 2008 | 05:18 AM | 1,054 | flatfiles.h |
| Sep. 9, 2008 | 05:18 AM | 51,048 | fmgroids.h |
| Sep. 9, 2008 | 05:18 AM | 1,241 | fmgrtab.h |
| Sep. 9, 2008 | 05:18 AM | 1,108 | formatting.h |
| Sep. 9, 2008 | 05:18 AM | 16,066 | geo_decls.h |
| Sep. 9, 2008 | 05:18 AM | 9,110 | guc.h |
| Sep. 9, 2008 | 05:18 AM | 6,495 | guc_tables.h |
| Sep. 9, 2008 | 05:18 AM | 492 | help_config.h |
| Sep. 9, 2008 | 05:18 AM | 5,633 | hsearch.h |
| Sep. 9, 2008 | 05:18 AM | 2,661 | inet.h |
| Sep. 9, 2008 | 05:18 AM | 3,864 | int8.h |
| Sep. 9, 2008 | 05:18 AM | 1,651 | inval.h |

-continued

| | | | |
|---|---|---|---|
| Sep. 9, 2008 | 05:18 AM | 1,599 | logtape.h |
| Sep. 9, 2008 | 05:18 AM | 5,610 | lsyscache.h |
| Sep. 9, 2008 | 05:18 AM | 4,826 | memutils.h |
| Sep. 9, 2008 | 05:18 AM | 6,024 | nabstime.h |
| Sep. 9, 2008 | 05:18 AM | 2,785 | numeric.h |
| Sep. 9, 2008 | 05:18 AM | 3,797 | palloc.h |
| Sep. 9, 2008 | 05:18 AM | 4,383 | pg_crc.h |
| Sep. 9, 2008 | 05:18 AM | 1,288 | pg_locale.h |
| Sep. 9, 2008 | 05:18 AM | 3,627 | pg_lzcompress.h |
| Sep. 9, 2008 | 05:18 AM | 906 | pg_rusage.h |
| Sep. 9, 2008 | 05:18 AM | 4,927 | plancache.h |
| Sep. 9, 2008 | 05:18 AM | 8,569 | portal.h |
| Sep. 9, 2008 | 05:18 AM | 728 | ps_status.h |
| Sep. 9, 2008 | 05:18 AM | 11,032 | rel.h |
| Sep. 9, 2008 | 05:18 AM | 2,439 | relcache.h |
| Sep. 9, 2008 | 05:18 AM | 4,442 | resowner.h |
| Sep. 9, 2008 | 05:18 AM | 6,302 | selfuncs.h |
| Sep. 9, 2008 | 05:18 AM | 3,164 | syscache.h |
| Sep. 9, 2008 | 05:18 AM | 12,372 | timestamp.h |
| Sep. 9, 2008 | 05:18 AM | 5,881 | tqual.h |
| Sep. 9, 2008 | 05:18 AM | 3,995 | tuplesort.h |
| Sep. 9, 2008 | 05:18 AM | 2,768 | tuplestore.h |
| Sep. 9, 2008 | 05:18 AM | 2,967 | typcache.h |
| Sep. 9, 2008 | 05:18 AM | 1,030 | tzparser.h |
| Sep. 9, 2008 | 05:18 AM | 916 | uuid.h |
| Sep. 9, 2008 | 05:18 AM | 3,873 | varbit.h |
| Sep. 9, 2008 | 05:18 AM | 2,976 | xml.h |

BACKGROUND

Technical Field

The present invention relates generally to recording digital telecommunication data, and more particularly to systems for reliably recording high performance digital voice telecommunication data.

Background Art

Problems exist in communications between personal computers ("PCs") and higher performance legacy telecommunications devices. Reliably communicating with digital telecommunications interfaces such as multiple T1/E1 lines and DS3/OC3 interfaces requires an error-free method of transferring data between the telecom line and a host PC. High density multi-channel telecommunications data is often transmitted using different clock speeds for different channels. Multiple channels of telecom audio with disparate clock frequencies are particularly difficult to group, packetize, synchronize and transmit over an interface that is prone to transmission errors.

Current implementations of Peripheral Component Interconnect ("PCI") bus telecommunication interface cards use the PCI, PCI-X, and PCI-Express bus interfaces. These comparatively expensive bus interfaces offer error free reliable bidirectional transmission.

Alternatively, the Universal Serial Bus ("USB") interface offers a fast, flexible, and efficient method of connecting external peripheral devices to a PC. The main advantages of USB connected devices are ease of use and "hot plug" ability. Despite recent attempts to improve reliability and performance of USB host controllers and target devices, in actual field conditions data transmission errors occur due to the nature of the USB hot plug interface. Data integrity cannot be fully guaranteed using conventional USB transfer methods.

Definitions

T-CARRIER A generic name for any of several digital, multiplexed telecommunications carrier systems originally developed by Bell Laboratories that are used in North America, Japan, and Korea.

DS0 Digital Signal 0, the basic unit of the T-carrier system, has a transmission rate of 64 kbit/s, and is commonly used for one voice-frequency-equivalent telecommunication channel. The DS0 channel forms the basis for a multiplexed digital telephonic transmission hierarchy both for the early plesiochronous systems such as T-carrier, and for modern synchronous systems such as SDH/SONET. Each DS0 channel may support twenty 2.4 kbit/s channels, ten 4.8 kbit/s channels, five 9.67 kbit/s channels, one 56 kbit/s channel, or one 64 kbit/s clear channel. For carrying a typical phone call, audio sound is digitized at an 8 kbit/s sample rate using 8-bit pulse-code modulation, usually u-law, which occupies the 64 kbit/s data rate of one DS0 clear channel. Multiple DS0 channels are multiplexed together to form higher capacity telecommunication circuits.

DS1 Digital Signal 1 is a T-carrier telecommunications signaling standard for carrying multiple DS0 channels each of which may carry voice and/or data transmissions between a network and a user. The DS1 signaling scheme is a widely used in North American, Japanese and South Korean telecommunications to transmit voice and data between devices. Technically, DS1 is the logical bit pattern transmitted over a physical T1 line, and, strictly speaking, DS1 is the data signal carried on a T1 circuit. However, the terms "DS1" and "T1" are often used interchangeably. A DS1 signal consists of twenty-four 8-bit channels (also identified as timeslots or DS0 channels), each channel carrying 64 kbit/s. A DS1 signal operates as a full-duplex circuit, which means the circuit concurrently transmits and receives 1.544 Mbit/s. A 1.536 Mbit/s bandwidth is achieved by sampling each of the twenty-four 8-bit DS0 channels 8000 times per second. An additional 8 kbit/s of overhead results from adding framing bits to the twenty-four 8-bit channels for a total bandwidth of 1.544 Mbit/s. Frame synchronization is necessary to identify the timeslots within each 24-channel frame. Synchronization takes place by allocating a framing, or 193rd, bit. This results in 8 kbit/s of framing data, for each DS1. Because this 8-kbit/s channel framing data overhead is used only by the transmitting equipment. A DS1 signal provides a user with only a 1.536 Mbit/s data rate.

T1 A physical copper wire telephone line called a T1 span which provides the first, lowest data rate of multiplexed T-carrier telecommunications. Outside of central offices "COs," a T1 span consists of conditioned cable pairs. A T1 span generally requires signal repeaters every 6000 feet, depending on cable gauge, with no more than 36 dB of loss before requiring a repeater. Presently, T1 copper spans are being replaced by optical communication systems. However, if a copper (metallic) span is used for a T1 span, it is provided by a HDSL encoded copper line. When a T-carrier communication system carries a DS0 channel, "robbed bit signaling" means that the transmitted DS0 channel is not guaranteed to be an error-free bit-stream. Voice equipment typically coerces the "robbed bits" for signaling to a state that will result in the far end properly handling errors, while applying an often different state to the customer equipment connected to the alarmed equipment.

E1 A European E-carrier standard, analogous to T1, that form part of the Plesiochronous Digital Hierarchy (PDH). An E1 link operates over two separate sets of wires, usually a twisted pair cable. The link's data rate is 2.048 Mbit/s (full duplex, i.e. 2.048 Mbit/s downstream and 2.048 Mbit/s upstream) which is split into 32 timeslots, each timeslot being allocated 8 bits, i.e. a single DS0 channel, in turn. Unlike the earlier T-carrier systems developed in North America, all 8 bits in each timeslot are available for each telephone call. This allows the E1 systems to be used equally well for circuit switch data calls, without risking the loss of any information. One of the 32 timeslots, i.e. timeslot (TS0), is reserved for framing purposes, and alternately transmits a fixed pattern. This allows the receiver to lock onto the start of each frame and match up each channel in turn. To detect if the circuit is losing bits (information), the E1 standard allows for a full Cyclic Redundancy Check to be performed across all bits transmitted in each frame. One timeslot (TS16) is often reserved for signalling purposes, to control call setup and teardown in accordance with one of several standard telecommunications protocols.

PRI Primary Rate Interface ("PRI") Integrated Services Digital Network ("ISDN") is a telecommunications signaling standard for carrying multiple DS0 voice and/or data transmissions between a network and a user. All data and voice channels are ISDN and operate at 64 kbit/s. For PRI ISDN, North American and Japanese telephone systems use a T1 system of 23 B channels each of which carries one DS0 signal, and one D channel which carries control and signaling information. Europe, Australia and most of the rest of the world use the slightly higher capacity E1 system, which is composed of 30 B channels, one synchronization channel and one D channel.

DS3 Digital Signal 3 is another T-carrier telecommunications signaling standard for carrying multiple DS0 voice and/or data transmissions between a network and a user. Generally, DS3 is used for transmitting multiplexed digital telecom data between COs. A DS3 channel, which operates at 44.736 Mbps, carries 28 DS1 channels, i.e. 672 DS0 channels (672 individual telephone calls), multiplexed into one single faster communications channel. Strictly speaking, a DS3 channel is the data carried on a T3 circuit, but in practice the terms are used interchangeably. Because each source of T1 data multiplexed into the DS3 channel has its own clock rate, each T1 channel carried on a DS3 channel may have a slightly different clock rate. For example, a difference of 50 parts (samples) per million in clock frequency may be found in the field. This clock rate difference means that 50/1,000,000 drift can occur between DS0 channel sampling rates found within signals carried on a single DS3 channel. For example, 0.005% * 1.544 Mbps equals 77 bytes of drift per second. 77 bytes/24 channels equals up to 3.2 samples (bytes) timing difference among DS0 channels. DS3 channels are rare except within buildings where they are used for interconnections and as an intermediate step before being multiplexed onto a SONET circuit. A customer who orders a DS3 channel usually has a SONET circuit entering its building with a multiplexer mounted in a utility box.

T3 A physical copper wire telephone line which carries DS3 signaling of multiplexed T-carrier telecommunications. T3 telephone lines is mostly used between telephone carriers, both wired and wireless. A T3 circuit has two coax cables (1 coax cable for sending and 1 coax cable for receiving) having BNC connectors on both ends. The coax cables must be made with true 75 ohm cable and connectors. Bellcore standard GR-139-CORE defines type 734 and 735 cables for a T3 circuit. Due to losses, each type of cable has differing distance limitations. 734 cable has a larger center conductor and insulator than the 735 cables, and therefore exhibits lower losses for a given distance. A T3 circuit can extend only about 600 feet (180m) between repeaters.

EAST/WEST Telephone data transmission is split into inbound and outbound streams (east and west directions) and combined only upon arrival near a telephone.

CONTROL Data indicating various different telephone set conditions such as on-hook, off-hook, Caller-ID, number dialed, routing information for the call, etc.

As described above, DS1 signaling is framed to provide 24 logical 64 Kbps DS0 channels. Each DS0 channel is designed to carry a single digitized telephone call. A T1 line provides 24×64 Kbps in usable bandwidth. This equates to 1.536 Mbps. The total bandwidth of a T1 line is actually 1.544 Mbps, which includes 8 Kbps in overhead.

Framing of DS1 signaling is necessary to provide a common data format and to provide a means for synchronizing the network. Two (2) common framing standards currently in use.

D4 framing is the principal framing method that was initially used with T1 networks. D4 framing is also known as SF format and as D3/D4 format framing. The D4 frame does not include a dedicated timeslot for the transfer of channel signaling. When end-to-end transfer of signaling is necessary, a technique called "robbed-bit signaling" is used. The "robbed bit" is the least significant bit (bit 8) of the channel byte, and is actually "robbed" only once in every six frames.

A D4 frame consists of 24 one byte samples from each of the 24 DS0s (192 bits). A single framing bit is sent in front of every 192 bit structure ([24×8]+1=193 bits per frame).

The D4 format provides limited supervision capabilities such as end-to-end reporting of local loss-of-signal (yellow alarm).

The F-bit pattern defines the structure of frames and multiframes. In D4 framing, the F-bit of consecutive frames is alternately interpreted as an $F_t$ bit (terminal framing bit) or $F_s$ bit (frame signaling bit).

$F_t$ pattern: alternating 0's and 1's, defines the frame boundaries.

$F_s$ pattern: fixed 001110 pattern, defines the multiframe boundaries, so that one frame may be distinguished from another. In particular, the $F^s$ pattern is needed so that frames 6 and 12 may be identified to enable recovery of signaling bits.

In the ESF frame format, the multiframe structure is extended to 24 frames, but the frame and channel structure are the same as in D4 framing. The ESF format provides improved supervision capabilities, and allows better utilization of the 8 kbps framing timeslots. The major advantage of the ESF format is that it supports on-line link performance monitoring (by means of a 2 kbps Cyclic Redundancy Check (CRC) channel) and in addition provides a 4 kbps end-to-end supervision and control data link. As described above, the PRI ISDN telecommunications signaling standard includes a D channel which carries control and signaling information. When carried on a T1 line, as described above PRI ISDN has 23 B channels each of which carries one DS0 signal, and the D control and signaling information channel.

FIFO First in, first out circular buffer for telecommunications data.

HOT PLUG Removal or insertion of an attached USB device while the power is applied to the controlling PC and the PC is operating.

U.S. Pat. No. 6,021,129 entitled "System and Method for Communicating Information from a Communications Link to a Host Using a Universal Serial Bus" that issued Feb. 1, 2000, on a patent application filed by Kimberly I. Martin, Kenneth A. Lauffenburger, Klaus S. Fosmark and William A. Perry, Jr. ("the Kimberly, et al. patent") discloses a modem for communicating information from a communications link to a host PC via the USB. The modem includes a memory for storing a plurality of network protocol Asynchronous Transfer Mode ("ATM") small fixed-sized digital data cells. ATM is a cell relay, packet switching protocol which provides data link layer services that run over Layer 1 links. This differs from other technologies based on packet-switched networks (such as the Internet Protocol or Ethernet) which employ variable sized packets (known as frames when referencing Layer 2). ATM data cells transport real-time video and audio as well as image files, text and email. The disclosed modem includes a receive manager that receives a plurality of ATM cells from the communications link and stores the ATM cells in the modem's memory. The receive manager formats the ATM cells into USB packets, and transmits each USB packet to a host PC as soon as the packet is full. The modem further includes a short packet instigator which determine if an ATM cell contains a termination condition associated with the content of the ATM cell. It an ATM cell contains a termination condition, short packet instigator transmits a short USB packet which carries less data than its capacity. Queuing delay in transmitting ATM cells and jitter in cell arrival render ATM unsuitable for voice telephonic communication. In addition to disclosing a modem that is unsuitable for voice telephonic communication, USB communication with the ATM modem disclosed in the Kimberly, et al. patent lacks any error correction capability.

U.S. Pat. No. 6,675,250 entitled "Fault Tolerant Communications Using a Universal Serial Bus" that issued Jan. 6, 2004, on a patent application filed by John Ditner and Marc Morin ("the Ditner, et al. patent") discloses a USB system for communication between two (2) or more USB hosts. The disclosed USB system provides a USB tree between each USB host and at least one USB function. The system further permits isolating a specified USB host from the at least one USB function. The Ditner, et al. patent discloses adding fault tolerance to USB devices by disconnecting failing USB hosts.

Published U.S. Patent Application no. 2006/0034230 entitled "Telecommunication Device" that was published Feb. 16, 2006, for a patent application filed in the names of Thomas Wellhausen and Ivo Gadow ("the Wellhausen published patent application") discloses a communication device that provides connections for a speech data transfer and digital data transfer between digital telecommunications terminals, analog telecommunications terminals and data processing appliances via Digital Subscriber Line ("DSL"). DSL is a family of technologies that provides digital data transmission over the wires of a local telephone network. DSL can be used at the same time and on the same telephone line with conventional telecommunications, i.e. plain old telephone service ("POTS"), because DSL uses frequency bands that are higher than the frequency band required for POTS telecommunication. xDSL is a general expression for high-speed DSL service in which x is replaced, for example, by A for an Asynchronous DSL transmission technique ("ADSL"), by S for a Synchronous DSL transmission technique ("SDSL"), by V for Very High Speed Digital Subscriber Line ("VDSL"), etc. The Wellhausen published patent application's disclosed xDSL terminal adapter autonomously sets up and clears connections in a public telecommunications network as well as on the Internet. The disclosed xDSL terminal adapter includes:

1. an xDSL modem that connects to an xDSL data line or to a broadband connection;
2. an ISDN signal converter connected to the xDSL modem and having at least one $S_0$ connection for ISDN terminals; and
3. an analog signal converter connected to the xDSL modem and having at least one a/b connection for analog terminals.

The xDSL terminal adapter includes a local area network ("LAN") port which is connected to a local area network, and a USB port which connects to the xDSL modem through a USB signal converter. A personal computer may be connected to the Internet by xDSL and through the USB and/or LAN interface provided in the xDSL terminal adapter. The LAN port's or the USB port's connection to the personal computer permits configuring the xDSL terminal adapter. The xDSL's terminal's single channel $S_0$ connection lacks error correction and is prone to audio interruption whenever a USB error occurs.

U.S. Pat. No. 6,978,412 entitled "Method And Apparatus For Adaptive Frame Tracking" that issued Dec. 20, 2005, on a patent application filed by Daniel B. Reents and Patrick Maupin ("the Reents, et al. patent") discloses a method for adaptively tracking and compensating for USB frame errors at the USB wire line level using a time stamp synchronizer. USB system communication sends and receives packets of data to and from computer peripherals and computer systems. The Reents, et al. patent discloses that packets of data, particularly isochronous frames of data, transmitted via a USB often lose synchronous flow thereby causing transmission errors. The Reents, et al. patent discloses an adaptive frame tracking unit capable of:

1. receiving and sending at least one data packet;
2. automatically adjusting data packet data rate by determining if at least one data frame error occurs; and
3. correcting for the data frame error upon determining that there exists at least one the data frame error.

The method disclosed in the Reents, et al. patent reduces small errors in USB bus packet transmission, but does not disclose transferring packets of data having embedded parity, and cannot transfer data having a clock rate that differs from USB clock rate.

Similar to the Reents, et al. patent, U.S. Pat. No. 6,658, 499 entitled "System and Method for ADSL USB Bandwidth Negotiation" that issued Dec. 2, 2003, on a patent application filed in the names of Robert A. Day, Kamran Khederzadeh and Kamal Patel ("the Day, et al. patent") discloses aa system and method for ADSL USB bandwidth negotiation. The system comprises a modem that is configured to transfer data between an ADSL line and a USB bus. The modem is further configured to:

1. receive an ADSL line rate setting;
2. submit an isochronous bandwidth request to a computer;
3. reduce the isochronous bandwidth request in response to the availability of isochronous bandwidth;
4. modify the ADSL line rate setting in response to the availability of isochronous bandwidth; and
5. modify the USB bus transfer mode in response to the availability of isochronous bandwidth.

In view of the preceding summaries of various, a need presently exists for error free communications of multichannel telecommunications data having differing clock rates via the hot-plugable but error prone fixed clock rate USB interface.

BRIEF SUMMARY

An object is receiving DS0 digital audio data from two or more T-carrier lines and reliably transmitting the received digital audio data to a computer via a USB interface.

Another object is receiving DS0 digital audio data from two or more T-carrier lines and efficiently transmitting the received digital audio data to a computer via a USB interface.

Briefly, among other concepts disclosed herein is a method for retiming digital telecommunications data received by a digital logger from a plurality of T-carrier type telephone lines respectively having differing clock sources. The method for retiming includes the steps of:

1. extracting a single frame of digital audio data from each incoming T-carrier DS0 channel received by the digital logger;
2. analyzing clock rates of digital audio data streams for all incoming T-carrier DS0 channels;
3. without affecting T-carrier signaling data, increasing digital audio data of T-carrier DS0 channels determined to have a slow clock rate by appropriately adding a byte of digital audio data to digital audio data carried by such T-carrier DS0 channels;
4. without affecting T-carrier signaling data, decreasing digital audio data of T-carrier DS0 channels determined to have a fast clock rate by appropriately removing a byte of digital audio data from digital audio data carried by such T-carrier DS0 channels; and
5. after processing digital audio data for all received T-carrier DS0 channels, repackaging all frames of received digital audio data into a single T-carrier superframe.

Another aspect disclosed herein is a digital logger for:

1. receiving digital telecommunications data that includes digital audio data from a plurality of T-carrier type telephone lines; and
2. retransmitting received digital audio data via a Universal Serial Bus ("USB") interface.

The disclosed digital logger includes volatile memory for temporarily storing digital audio data received from the plurality of T-carrier type telephone lines for buffering the digital audio data within the digital logger during interruptions in transmission of digital audio data from the digital logger via the USB interface. Another aspect of the digital logger's volatile memory is temporarily storing digital audio data received from the plurality of T-carrier type telephone lines. In temporarily storing digital audio data to reduce audible latency of speech communications:

1. an amount of volatile memory used for temporarily storing digital audio data received from the plurality of T-carrier type telephone lines is resized automatically; and
2. clock rate is dynamically shifted slightly.

These and other features, objects and advantages will be understood or apparent to those of ordinary skill in the art from the following detailed description of the preferred embodiment as illustrated in the various drawing figures.

DETAILED DESCRIPTION

Figure 1:
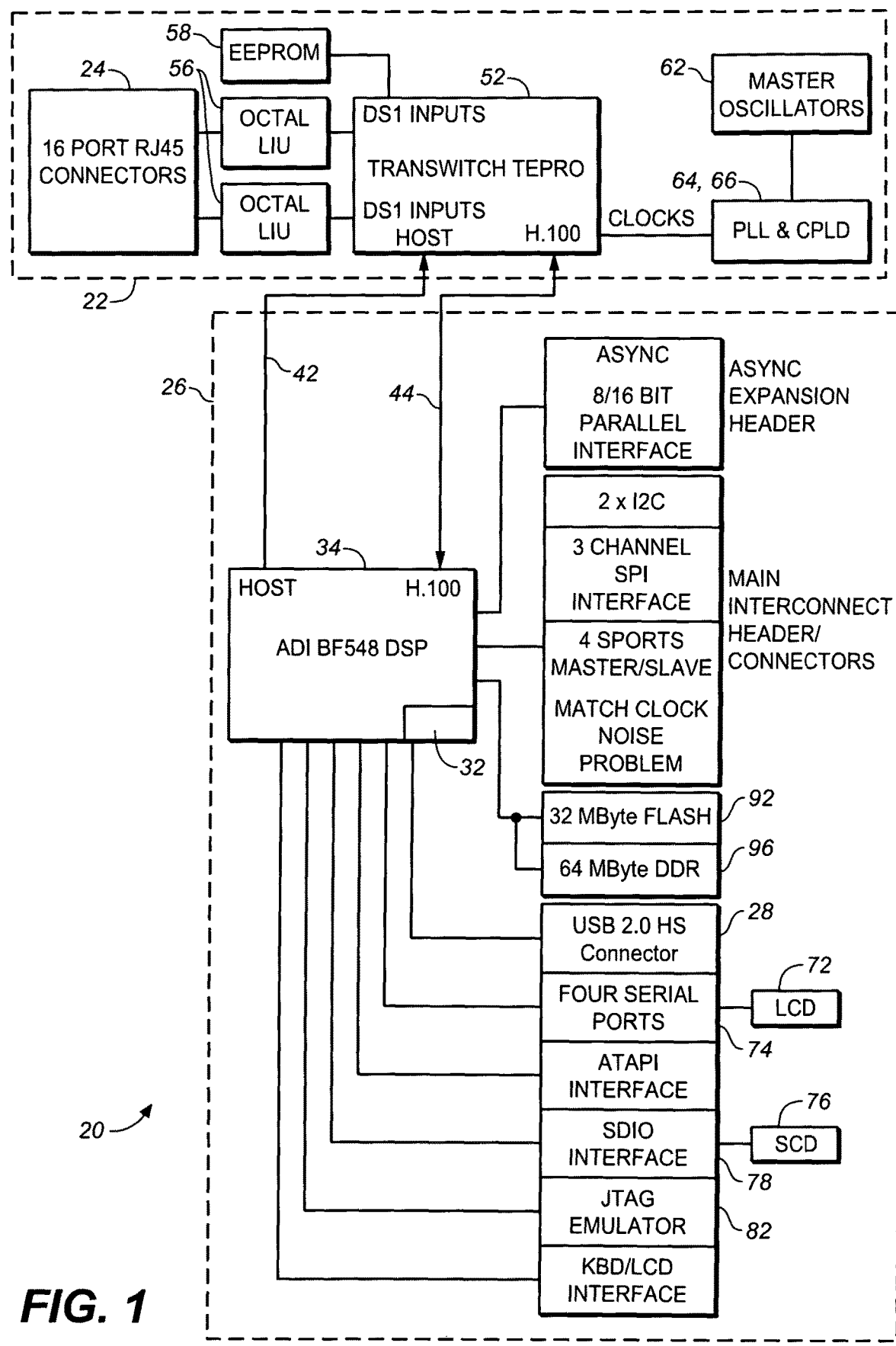
FIG. 1 is a block diagram depicting a 8-channel digital logger in accordance with the present disclosure adapted for exchanging digitized voice telephone data with eight T-carrier lines, and for also exchanging that digital telephone data with a host computer via the host computer's USB port.

The block diagram of FIG. 1 depicts an 8-channel digital logger indicated by the general reference number 20. The 8-channel digital logger 20 is preferably assembled on two (2) separate printed circuit boards. A T1 interface board 22 of the 8-channel digital logger 20, enclosed within a dashed line in FIG. 1, receives and transmits bidirectional digitized voice and signaling telephonic communications via a 16 port RJ45 connector 24. The 16 port RJ45 connector 24 connects the T1 interface board 22 to eight (8) bidirectional T-carrier type telephone lines. The 8-channel digital logger 20 also includes a digital signal processor ("DSP") board 26, also enclosed within a dashed line in FIG. 1. The DSP board 26 exchanges digitized voice data and telephonic signaling for digital telephonic communications with a host PC, not illustrated in any of the FIGs., via a USB-B connector 28 that connects by a USB cable, also not illustrated in any of the FIGs., to the host PC's USB-A connector.

Within the DSP board 26, the USB-B connector 28 connects to a USB controller 32 that is included in a digital signal processor IC 34. The digital signal processor 34 is preferably an ADSP-BF548 Blackfin Embedded Processor sold by Analog Devices of Norwood, Mass.

Two (2) buses, a host bus 42 and a H.100 bus 44, interconnect the digital signal processor 34 of the 8-channel digital logger 20 with a Channelized DS3 Access Device 52 included in the T1 interface board 22. The Channelized DS3 Access Device 52 is preferably a TEPro™ Channelized DS3 Access Device TXC-06830 sold by TranSwitch Corporation of Shelton, Conn. For digital audio data received via the 16 port RJ45 connector 24, the Channelized DS3 Access Device 52 retimes the data to a clock signal generated within the 8-channel digital logger 20.

A computer program executed by the digital signal processor 34 communicates with the Channelized DS3 Access Device 52 via the host bus 42 to control operation of the Channelized DS3 Access Device 52. The Channelized DS3 Access Device 52 and the digital signal processor 34 exchange digital voice data via the H.100 bus 44. Signal lines included in the H.100 bus 44 interconnecting the Channelized DS3 Access Device 52 and the digital signal processor 34 carry:

1. framing data that identifies that particular DS0 of twenty-four (24) DS0s carried on a T1 line whose data is presently being transferred via the H.100 bus 44;
2. a clock signal for the data transfer; and
3. the digital voice data. Operating the 8-channel digital logger 20 for acquiring digital voice data causes most digital voice data transmissions via the digital signal processor 34 to go from the Channelized DS3 Access Device 52 to the digital signal processor 34. However, to provide warning messages and other instructions, the digital signal processor 34 can transmit digital voice data to the Channelized DS3 Access Device 52 via the H.100 bus 44.

As understood by those skilled in the art and as described above, the signal on a T1 line of a T-carrier type telephone line travels over conditioned cable pairs known as a T1 span. One pair of each T1 span carries incoming digital voice data while the other pair carries outgoing digital voice data. As described above, this voice data transmission convention, sometimes referred to as East/West, splits each of the 24 telephone calls carried on a T1 line into inbound and outbound streams (East and West directions) that are combined only upon arrival near a telephone. To comply with this convention, the T1 interface board 22 includes two (2) eight channel line interface ICs 56 disposed between the Channelized DS3 Access Device 52 and the 16 port RJ45 connector 24. Each line interface IC 56 is preferably an IDT82V2088 Octal T1/E1/J1 Long Haul/Short Haul Line Interface Unit sold by Integrated Device Technology, Inc. of Santa Clara, Calif.

Figure 3:
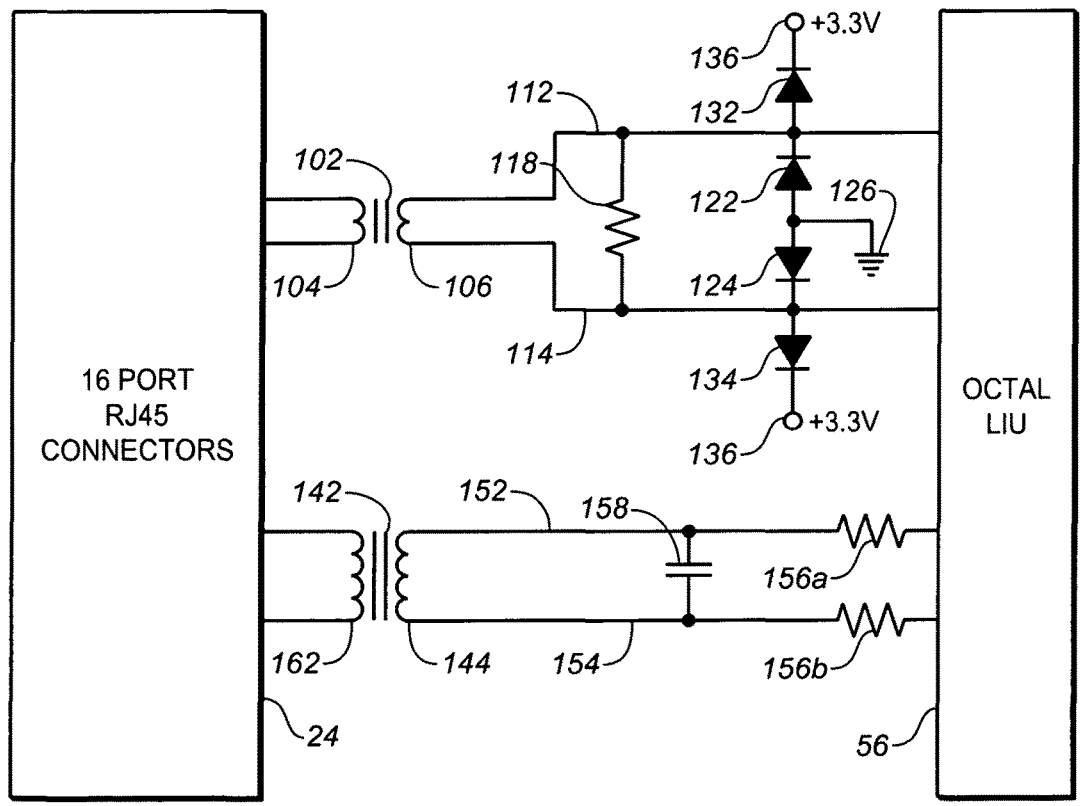
FIG. 3 is a schematic diagram depicting one (1) of eight (8) isolation circuits included in the 8-channel digital logger illustrated in FIG.

Though not separately depicted in FIG. 1, to avoid requiring a separate electrical termination for the T1 line at the 8-channel digital logger 20, the 8-channel digital logger 20 includes eight (8) isolation circuits, one for each T1 span, that are located between the 16 port RJ45 connector 24 and the line interface IC 56. One of these isolation circuits is illustrated in FIG. 3 and described in greater detail below.

Figure 2:
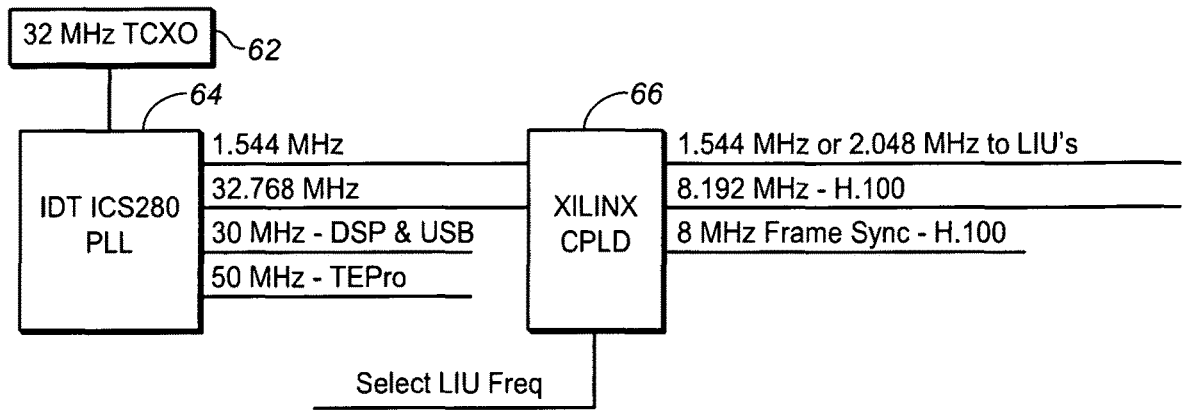
FIG. 2 is a block diagram depicting in greater detail a clock generator circuit illustrated in FIG. 1.

In addition to the Channelized DS3 Access Device 52 and the two (2) line interface ICs 56, the T1 interface board 22 includes an ("EEPROM") 58 that is coupled to the Channelized DS3 Access Device 52, and which stores a computer program that is loaded into and executed by the Channelized DS3 Access Device 52. Lastly the T1 interface board 22 includes a clock generator circuit that, as depicted in greater detail in FIG. 2, includes a 32 MHz crystal oscillator 62, a phase locked loop ("PLL") 62 and a complex programmable logic device ("CPLD") 66.

Considering again the DSP board 26 illustrated in FIG. 1, the 8-channel digital logger 20 preferably includes a liquid crystal display ("LCD") 72 that is coupled to one (1) of four (4) serial ports 74 included in the preferred digital signal processor 34. The DSP board 26 also permits connecting a secure data card ("SDC") 76 to a SDIP interface 78 of the digital signal processor 34. A JTAG emulator 82 included in the digital signal processor 34 facilitates debugging a computer program executed by the digital signal processor 34.

A non-volatile 32 MByte flash memory 92 included in the DSP board 26 is coupled to the digital signal processor 34 and supplies a computer program executed by The digital signal processor 34. The digital signal processor 34 uses a 64 MByte double data rate synchronous dynamic random access memory ("DDR SDRAM") memory 96 for program storage and for temporarily storing digital voice data either between its reception from the Channelized DS3 Access Device 52 and transmission to the USB-B connector 28, or conversely. If the digital voice data exceeds the capacity of the 64 MByte DDR SDRAM memory 96, the digital signal processor 34 stores additional digital voice data in a SDC 76 connected to the SDIP interface 78. Storing digital voice data in the SDC 76 is particularly useful if the host PC becomes unavailable perhaps because it must be rebooted, or if software executed by the host PC is being upgraded. When the host PC resumes normal operation, the computer program executed by the digital signal processor 34 transfers received and stored digital audio data from the 64 MByte DDR SDRAM memory 96 and the SDC 76 to the host PC via the DSP board 26.

FIG. 3 depicts the isolation circuit for a single T-carrier line, specifically for a T1 span. As stated previously, the 8-channel digital logger 20 includes eight (8) isolation circuits of the type illustrated in FIG. 3. For receiving an inbound digital telecommunication signal, each isolation circuit of the 8-channel digital logger 20 includes an inbound transformer 102 having a primary winding 104 that connects via the 16 port RJ45 connector 24 to the inbound (East) line of a T1 span. A secondary winding 106 of the inbound transformer 102 connects via lines 112 and 114 to input terminals of the line interface IC 56. A resistor 118, preferably having a resistance of 220 ohms ("Q"), connects across the lines 112 and 114. Cathodes of a first pair of protection diodes 122 and 124 connect respectively to one of the lines 112 and 114 while anodes of the protection diodes 122 and 124 connect in parallel to circuit ground 126. Anodes of a second pair of protection diodes 132 and 134 connect respectively to one of the lines 112 and 114 while cathodes of the protection diodes 132 and 134 connect in parallel to a positive supply voltage 136, preferably +3.3 volts ("V") direct current ("DC").

In addition to the inbound transformer 102, each isolation circuit also preferably includes an outbound transformer 142 having a primary winding 144. The primary winding 144 connects via lines 152 and 154 respectively to terminals of resistors 156*a* and 156*b* that preferably have a resistance of 9.1 Q. Other terminals of the resistors 156*a* and 156*b* connect to output terminals of the line interface IC 56. A capacitor 158, preferably having a capacitance of 560 pico Farads ("pF"), connects in parallel with the primary winding 144 between terminals of the resistors 156*a* and 156*b*. A secondary winding 162 of the outbound transformer 142 connects via the 16 port RJ45 connector 24 to the outbound (West) line of a T1 span for transmitting a digital telecommunication signal from the 8-channel digital logger 20.

Data Reformatting and Retiming

The following data reformatting and retiming method provides reliable retransmission to a host PC via a conventional USB connection and protocols for received multi-channel digital telecommunications data that has been previously multiplexed onto a T1 and/or T3 span of a T-carrier type telephone line. The method provides error free transmission over the unreliable conventional USB connection while retaining the ability to hot-plug USB devices.

The basic data transfer process is described below as encoding and handshaking. For clarity, the description below explains the transfer in a single direction, i.e. from the 16 port RJ45 connector 24 to the USB-B connector 28. The process is simply reversed to move data in the opposite direction, i.e. from the USB-B connector 28 to the 16 port RJ45 connector 24.

Data Encoding and Transfer Process (16 port RJ45 connector 24 to USB-B connector 28, as viewed from the digital signal processor 34)

1. Sample a single frame of digital audio data from each DS0 channel of a T1 line, i.e. from each DS0. The frame size should be as small as possible to reduce latency, i.e. 64-256 bytes.
2. Analyze clock rate of all incoming DS0 DS0 channels. This is accomplished by first unpacking each DS0 stream and then analyzing the minimum and maximum data rate of every DS0 contained within every T1 line, E1 line, or PRI included in every DS3. For a T1 line, all DS0 channels will typically operate at the same clock rate. Determine the minimum and maximum real-time clock rates.
3. Interpolate audio data in the digital signal processor 34, adding a byte where necessary to the DS0 data for channels with slow clock rates without affecting the signaling information. The position of embedded D4 framing in DS1 signaling is mapped around and avoided.
4. Where extra bytes exists in a DS0, removing only audio, not signaling information. If necessary, add a byte of digital audio data to the DS0 data, leaving the signaling streams unchanged. Adding and removing only audio bytes is important to preserve the data integrity of the voice communication. To do this, the digital signal processor 34 must parse every stream to determine where the signaling bytes (or bits) are located.
5. To enhance audio quality, the digital signal processor 34 does not add bytes which are simply a duplicate of the previous byte in that stream (as done in conventional telecommunications products). The digital signal processor 34 instead interpolates the audio waveform and inserts a byte at a level between the previous and subsequent audio samples. Adding interpolated bytes to digital voice data provides slight a improvement in audio quality.
6. Once add and slip (insert and remove) processing is completed, the computer program executed by the digital signal processor 34 repackages all frames into a single superframe.
7. Then the computer program executed by the digital signal processor 34 generates a CRC code for the superframe, and attaches a packet identifier to the superframe.
8. The digital signal processor 34 then sends the identifier, superframe, and CRC to the host PC via the USB-B connector 28 and waits for acknowledgement. While waiting for an acknowledgement from the host PC, the digital signal processor 34 continues buffering digital telecom data through the USB handshaking process.
9. If the PC acknowledges receipt of a valid superframe with CRC, the digital signal processor 34 then proceeds to process the next frame of digital voice data. If the host PC does not acknowledge receipt of a valid superframe with CRC, hold the superframe which was not successfully transmitted in a circular RAM FIFO buffer. Check the threshold limit (#1 below), and continue the encoding process (#1 above).

T-Carrier Control Information

As known to those skilled in the art, DS1, DS3 and PRI signaling includes control information. However, as described above control information varies in format depending on the type of signaling format carried on a T1 line, i.e. DS1 or DS3 signaling format which uses D4 framing for control information or PRI ISDN signaling format that includes a separate "D channel" for control information. Operation of the Channelized DS3 Access Device 52 extracts control information bits from the telecommunication signals received by the 8-channel digital logger 20. As described previously, for DS1 or DS3 signaling that uses D4 framing, the control information bits are buried in the audio, i.e. "robbed bit signaling. As also described previously, PRI ISDN signaling transmits control information on a separate "D channel."

Note that DS3 signaling may carry a mix of different T-carrier signaling formats, i.e. a number of DS1 channels that use D4 framing for control information combined with a number of PRI ISDN channels that use the "D channel" for control information. Retiming of every DS0 channel received by the 8-channel digital logger 20 to a single clock signal within the digital signal processor 34 permits the 8-channel digital logger 20 to operate successfully in this complex signaling environment. For example, retiming of DS0 channels within the digital signal processor 34 permits the 8-channel digital logger 20 to operate successfully with perhaps five (5) T1 lines connected to the 16 port RJ45 connector 24 together with three (3) PRI ISDN lines connected to the 16 port RJ45 connector 24.

Note that the computer program executed by the digital signal processor 34 transmits digital audio data to the PC host via the USB controller 32 and the USB-B connector 28 for only those received DS0 channels that are "off hook" as indicated by control information extracted by the Channelized DS3 Access Device 52 from signals on the various T-carrier lines connected to the 16 port RJ45 connector 24. Transmitting from the 8-channel digital logger 20 to the host PC only digital audio data for DS0 channels that are "off hook" saves USB bandwidth while concurrently reducing the load on the host PC. Saving USB bandwidth improves USB performance and increases USB data transmission reliability. Note that USB "DMA transfers" adversely affect host PC performance even if data transferred via the USB is discarded and never used by computer program(s) executed by the host PC. Consequently, transmitting from the 8-channel digital logger 20 to the host PC only digital audio data for DS0 channels that are "off hook" permits transferring many more channels of digital audio data without overburdening the host PC.

Method for Handling USB Data Transfer Interruptions

1. When digital voice data stored in the 64 MByte DDR SDRAM memory 96 exceeds a pre-established threshold, the computer program executed by the digital signal processor 34 begins initializing a FIFO in nonvolatile 32 MByte flash memory 92 to support buffering throughout long interruptions in USB communications with the host PC (such as a machine reboot or operating system update).

2. As the FIFO in the 64 MByte DDR SDRAM memory 96 approaches the memory's capacity, the computer program executed by the digital signal processor 34 begins storing untransmitted superframes sequentially into a second FIFO located in the SDC 76. A sequential serial number is attached to each superframe stored into this second FIFO.

3. After the 8-channel digital logger 20 re-establishes a USB connection to the host PC as evidenced by successful USB enumeration, the computer program executed by the digital signal processor 34 begins emptying the digitized audio data first from the SDC 76 transferring packets to the host PC at the maximum available USB data rate.

Handshaking Process Viewed From the Host PC

1. Receive initialization including serial number and type of attached device upon initial USB connection and enumeration. Open a pipe with appropriate communications driver matching the attached device.
2. Wait for arrival of a superframe of data from the USB-B connector 28.
3. Assign USB endpoints for the received data.
4. Receive the superframe of digital voice data, check serial number of superframe and check the CRC to assess whether the received data is correct.
5. If the is CRC correct, then send a message confirming receipt of good superframe to the digital signal processor 34 via USB. Record the superframe of digital voice data in local PC buffer and unpack. if the CRC is incorrect, send an error report to digital signal processor 34 requesting that the digital signal processor 34 resend the missing data.
6. Check serial number of received superframe. Send matching superframe from the host PC to the 8-channel digital logger 20, i.e. in the opposite direction, to maintain East-West audio time synchronization.
7. Return to #2 above In the case of larger blocks of errors which activate the non-volatile memory buffer in the 8-channel digital logger 20, a timeout will cause the system to reconnect using #1 above. The digital signal processor 34 and the host PC will then transfer digital voice data swiftly until emptying the FIFO in the SDC 76.

For data sent from the PC to a T1 line via the 8-channel digital logger 20, the preceding processes operate in reverse, with the host PC buffering the digital voice data being transferred to the digital signal processor 34. The digital signal processor 34 then becomes responsible for synchronizing the East data streams to West clock during digital voice data transmission via the Channelized DS3 Access Device 52.

Note that the USB transfer rate is set more than double the aggregate data rate of the incoming telecommunications data. That is, a 480 Mbs USB transmission rate will typically support a telecommunications data rate via the 16 port RJ45 connector 24 of slightly more than 200 Mbs aggregate.

Although the present invention has been described in terms of the presently preferred embodiment, it is to be understood that such disclosure is purely illustrative and is not to be interpreted as limiting. For example, although the preferred embodiment of the 8-channel digital logger 20 uses the digital signal processor 34, it is readily apparent to those skilled in the art that the 8-channel digital logger 20 disclosed herein could alternatively be implemented using a complex instruction set computer ("CISC") or a reduced instruction set computer ("RISC") processor. Similarly, the USB controller 32 may be included in the digital signal processor 34, or the USB controller 32 may be implemented as a separate IC. Consequently, without departing from the spirit and scope of the disclosure, various alterations, modifications, and/or alternative applications will, no doubt, be suggested to those skilled in the art after having read the preceding disclosure. Accordingly, it is intended that the following claims be interpreted as encompassing all alterations, modifications, or alternative applications as fall within the true spirit and scope of the disclosure including equivalents thereof. In effecting the preceding intent, the following claims shall:

1. not invoke paragraph 6 of 35 U.S.C. § 112 as it exists on the date of filing hereof unless the phrase "means for" appears expressly in the claim's text;
2. omit all elements, steps, or functions not expressly appearing therein unless the element, step or function is expressly described as "essential" or "critical;"
3. not be limited by any other aspect of the present disclosure which does not appear explicitly in the claim's text unless the element, step or function is expressly described as "essential" or "critical;" and
4. when including the transition word "comprises" or "comprising" or any variation thereof, encompass a non-exclusive inclusion, such that a claim which encompasses a process, method, article, or apparatus that comprises a list of steps or elements includes not only those steps or elements but may include other steps or elements not expressly or inherently included in the claim's text.

What is claimed is:

1. A method for retiming digital telecommunications data received by a digital logger from at least one T-carrier type telephone line wherein individual DS0 channels of the T-carrier type telephone line may have differing clock sources, the method for retiming comprising the steps of:
   a. extracting a single frame of digital audio data for each incoming T-carrier DS0 channel received by the digital logger wherein individual frames of digital audio data do not exceed two-hundred fifty-six (256) bytes;
   b. analyzing clock rates of digital audio data streams for all incoming T-carrier DS0 channels;
   c. without affecting T-carrier signaling data, increasing digital audio data of T-carrier DS0 channels determined to have a slow clock rate by appropriately adding a byte of digital audio data to digital audio data carried by such T-carrier DS0 channels;
   d. without affecting T-carrier signaling data, decreasing digital audio data of T-carrier DS0 channels determined to have a fast clock rate by appropriately removing a byte of digital audio data from digital audio data carried by such T-carrier DS0 channels; and
   e. after processing digital audio data for all received T-carrier DS0 channels, repacking all frames of received digital audio data into a single T-carrier superframe.

2. A method for retiming digital telecommunications data received by a digital logger from at least one T-carrier type telephone line wherein individual DS0 channels of the T-carrier type telephone line may have differing clock sources, the method for retiming comprising the steps of:
   a. extracting a single frame of digital audio data for each incoming T-carrier DS0 channel received by the digital logger;

b. analyzing clock rates of digital audio data streams for al incoming T-carrier DS0 channels wherein analyzing the clock rates of all incoming T-carrier DS0 channels includes the substeps of:
  i. unpacking each T-carrier DS0 channel digital audio data stream; and
  ii. determining the minimum and maximum clock rate for the incoming T-carrier DS0 channel digital audio data stream;
c. without affecting T-carrier signaling data, increasing digital audio data of T-carrier DS0 channels determined to have a slow clock rate by appropriately adding a byte of digital audio data to digital audio data carried by such T-carrier DS0 channels;
d. without affecting T-carrier signaling data, decreasing digital audio data of T-carrier DS0 channels determined to have a fast clock rate by appropriately removing a byte of digital audio data from digital audio data carried by such T-carrier DS0 channels; and
e. after processing digital audio data for all received T-carrier DS0 channels, repackaging all frames of received digital audio data into a single T-carrier superframe.

3. A method for retiming digital telecommunications data received by a digital logger from at least one T-carrier type telephone line included among T-carrier telephone lines wherein individual DS0 channels of the T-carrier type telephone line may have differing clock sources, the method for retiming comprising the steps of:
  a. extracting a single frame of digital audio data for each incoming T-carrier DS0 channel received by the digital logger;
  b. analyzing clock rates of digital audio data streams for all incoming T-carrier DS0 channels;
  c. without affecting T-carrier signaling data, increasing digital audio data of T-carrier DS0 channels determined to have a slow clock rate by appropriately adding a byte of digital audio data to digital audio data carried by such T-carrier DS0 channels wherein digital audio data bytes added to digital audio data carried by slow T-carrier DS0 channels specify an interpolated digital audio data level that lies between levels of immediately preceding and succeeding digital audio data;
  d. without affecting T-carrier signaling data, decreasing digital audio data of T-carrier DS0 channels determined to have a fast clock rate by appropriately removing a byte of digital audio data from digital audio data carried by such T-carrier DS0 channels; and
  e. after processing digital audio data for all received T-carrier DS0 channels, repackaging all frames of received digital audio data into a single T-carrier superframe.

4. A digital logger for:
  a. receiving digital telecommunications data that includes digital audio data from at least one incoming DS0 channel of a T-carrier type telephone line; and
  b. retransmitting the received digital audio data via a Universal Serial Bus ("USB") interface,
the digital logger comprising:
  a. volatile memory for temporarily storing digital audio data received from the at least one incoming DS0 channel of the T-carrier type telephone line for buttering the digital audio data within the digital logger during interruptions in transmission of digital audio data from the digital logger via the USB interface; and
  b. non-volatile memory for temporarily storing digital audio data received from the at least one incoming DS0 channel of the T-carrier type telephone line that exceeds storage capacity of the volatile memory for buffering the digital audio data within the digital logger during interruptions in transmission of digital audio data from the digital. logger via the USB interface.

5. The method of claim 2 wherein frames of digital audio data extracted from each incoming T-carrier DS0 channel do not exceed two-hundred fifty-six (256) bytes.

6. The method of claim 3 wherein frames of digital audio data extracted from each incoming T-carrier DS0 channel do not exceed two-hundred fifty-six (256) bytes.

7. The method of claim 3 wherein analyzing the clock rates of all incoming T-carrier DS0 channels includes the substeps of:
  i. unpacking each T-carrier DS0 channel digital audio data streams; and
  ii. determining the minimum and maximum clock rate for the incoming T-carrier DS0 channel digital audio data streams.

8. The method of claim 7 wherein frames of digital audio data extracted from each incoming T-carrier DS0 channel do not exceed two-hundred fifty-six (256) bytes.

* * * * *